Sept. 13, 1966  F. A. DE WITT ETAL  3,272,306
JUSTIFICATION ZONE-INDICATING COUNTER
Filed March 19, 1963  17 Sheets-Sheet 2

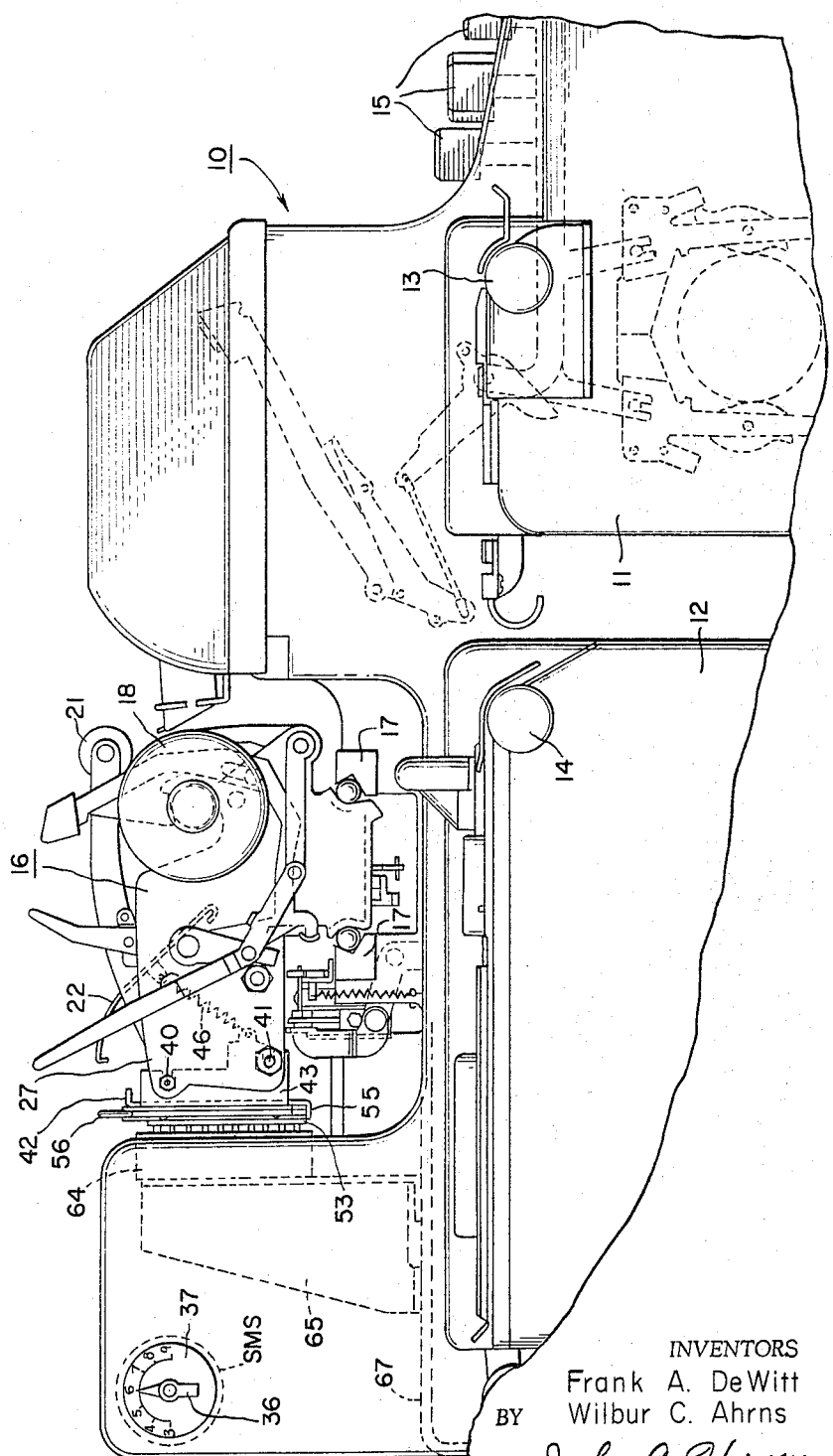

| FIG. 10 | | | |
|---|---|---|---|
| FIG. 10a | FIG. 10e | FIG. 10i | FIG. 10j |
| FIG. 10b | FIG. 10f | | |
| FIG. 10c | FIG. 10g | FIG. 10k | |
| FIG. 10d | FIG. 10h | FIG. 10l | |

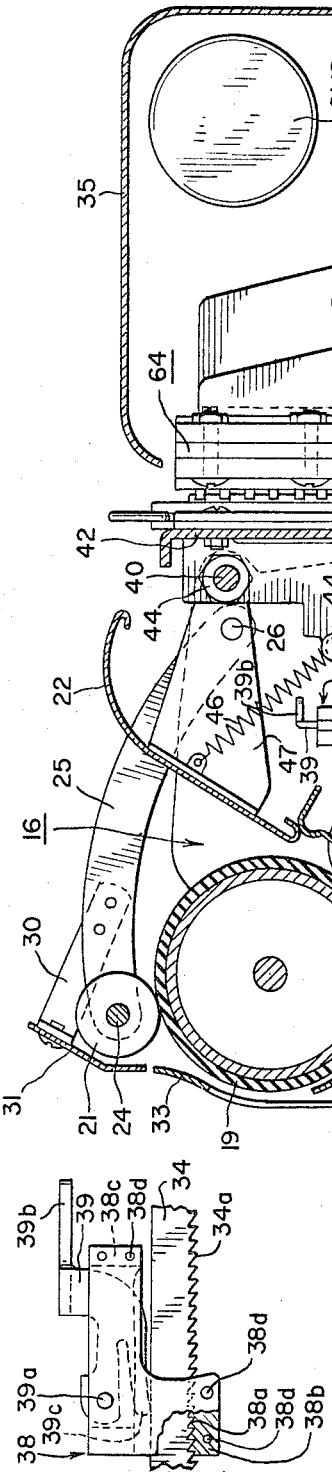

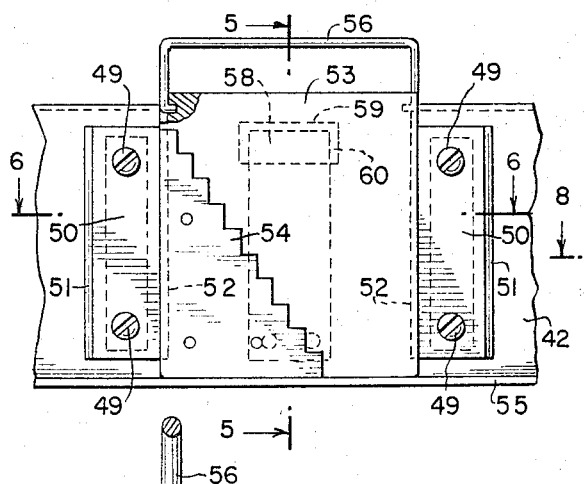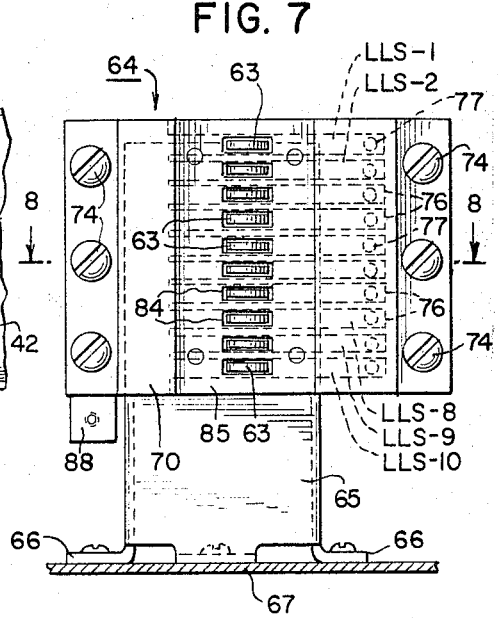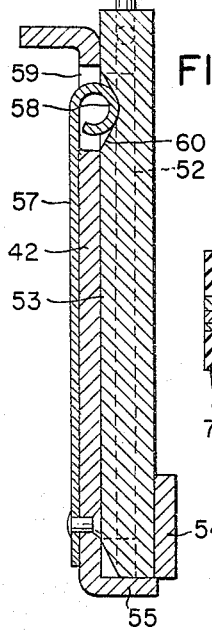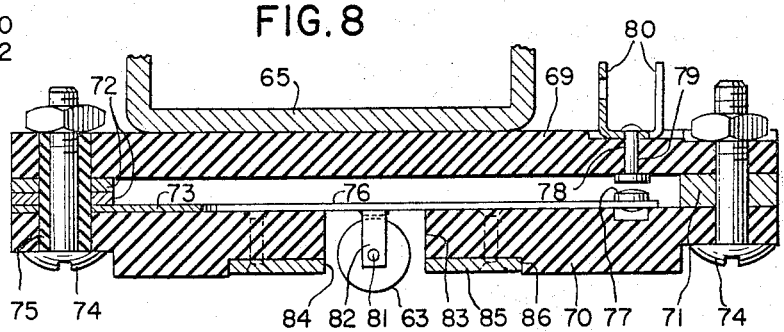

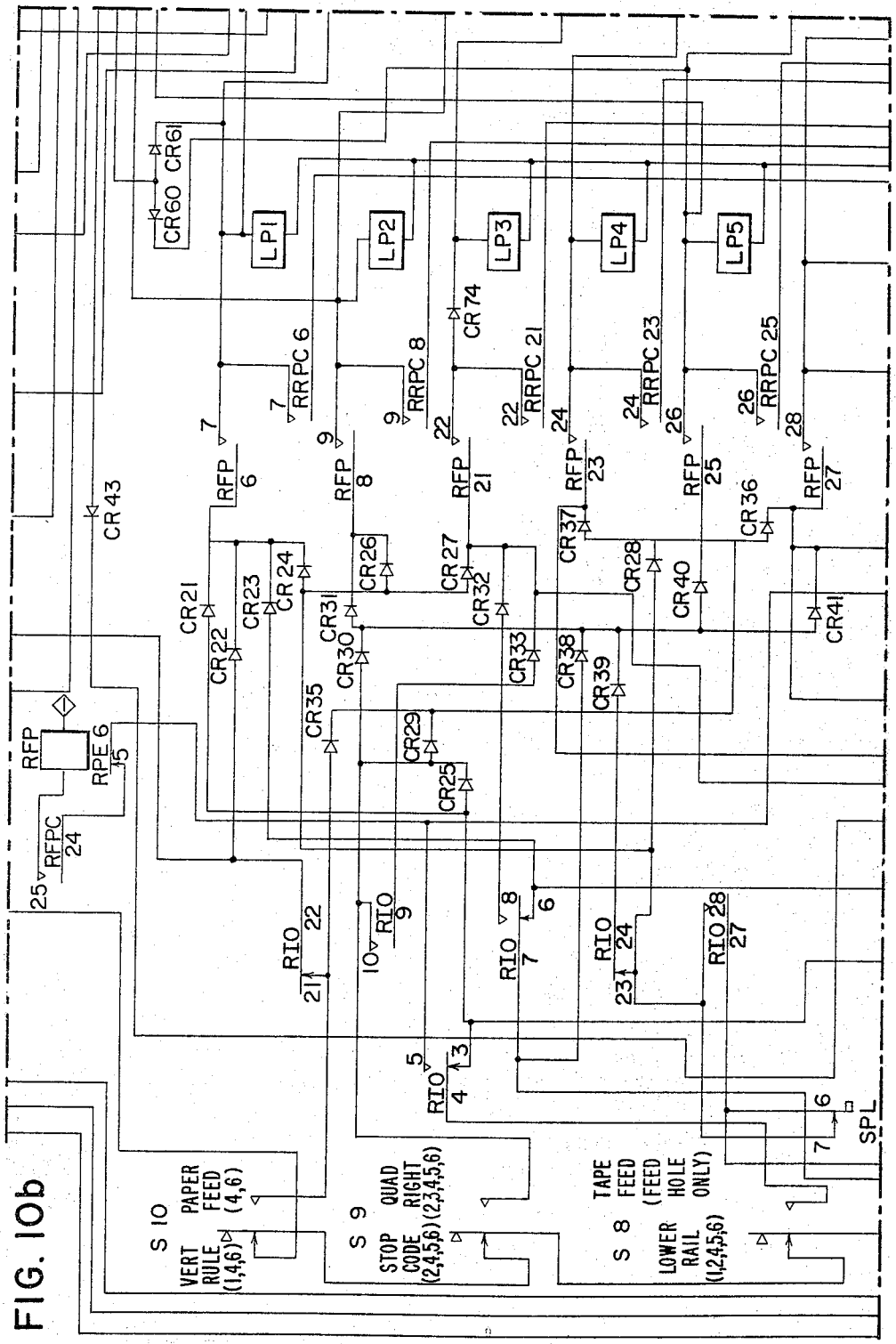

United States Patent Office 3,272,306
Patented Sept. 13, 1966

3,272,306
JUSTIFICATION ZONE-INDICATING COUNTER
Frank A. De Witt and Wilbur C. Ahrns, Rochester, N.Y., assignors, by mesne assignments, to Friden, Inc., San Leandro, Calif., a corporation of Delaware
Filed Mar. 19, 1963, Ser. No. 266,430
9 Claims. (Cl. 197—187)

The present invention relates to structures for enabling justification of lines of printed matter, and particularly, to justification-zone indicating counters. While the invention has utility in numerous and diverse applications, it has particular utility for incorporation into punch-tape recording electric typewriter structures and will be described in that connection.

Present day printing practices usually accomplish typesetting by either a so-called "cold type" or a "hot type" method. It is the almost universal practice, by whatever method is used to set the type, to justify each line of type according to a desired column width. The "cold type" method preferably uses a justification typewriter, such as a tape-controlled typewriter of the type disclosed in the Blodgett U.S. Patents Nos. 2,700,421 and 2,700,-447, and composes clean typewritten copy with all headings, paragraphs and general format laid out in positionally spaced arrangement in readiness for photographic reproduction of printing plates from which final printed copy is reproduced. The "hot type" method makes use of a line casting machine which manufactures a line of type in one metal slug. A galley of these lines is easier to handle and the slug, once used, is melted down so the metal can be used in the line casting machine to manufacture new slugs.

A conventional line casting machine is equipped with magazines which hold brass matrices for each individual alpha-numeric character and symbol. These magazines may be readily changed to change the size or style of type as required for a particular job. The machine includes a manually operable keyboard, and each operation of a key releases a particular matrix from a magazine into an assembler. Spacebands are assembled with the matrices to provide interword spaces, and upon completion of a justifiable line length of matrices the assembly is elevated and transferred to a position between vise jaws defining the length of the line desired. The spacebands are comprised of two cooperating wedges of tempered steel interlocked so that the wedges may slide freely against one another while their outer matrix engaging faces remain parallel. The assembly of matrices is justified by retaining one spaceband wedge stationary while the other is moved longitudinally to expand the interword spaces until the end matrices engage the vise jaws. This is done while the assembly of spacebands and matrices are positioned in front of the casting mechanism, and justification of the assembly in the manner just described is followed by the forcing of molten metal into a mold cavity of which the justified matrix assembly forms one end wall surface. The molten metal fills the alpha-numeric characters and symbols engraved in the face of the matrices, whereby a line of type is cast as a slug when the molten metal solidifies. The slug is thereafter machine trimmed and transferred into a galley where it joins the slugs previously cast. Thereafter the assembly of matrices and spacebands is dissembled and distributed back to the magazine channels from which they came.

Each line assembly of matrices is accomplished at a location somewhat off to one side of the operator's position at the keyboard but within the range of view of the operator. Further, the visable front surface of each matrix in the assembly carries an identifying alpha-numeric character or symbol enabling operator inspection of the information content within an assembled line.

Manual operation of the line casting machine keyboard is not, however, accompanied by the visual reproduction of any printed matter corresponding to the line of type which will result from the assembly. Thus typographical errors are frequently not discovered until the resultant slugs are proof printed, and any error discovered at this time necessitates the fabrication of a new error-free slug and its manual substitution for the slug containing the typographical error. This time consuming and costly proof printing, and the equally time consuming any typographical errors noted, is highly undesirable and results in excessive printing costs.

With a view to increasing the operational accuracy and efficiency of line casting machines, there is an increasing trend toward their automatic control by use of punched tape. Operator efficiency is greatly increased by eliminating the time consuming routines and distractions inherent in the manual operation of a line casting machine. The operational efficiency of the machine itself is increased since the maximum operational speed of the machine becomes its working speed. There is the further advantage that the information recorded in the tape can be transmitted by wire to distant points in perfectly justified form, and the tape can be immediately used or temporarily stored for later use and is available for any "reruns" desired.

The punched tape is of relatively durable character and records alpha-numeric characters and symbols to be type set (together with necessary instructions used in machine control) as successive information item codes. This tape is placed in a tape reader which forms a component of the line casting machine and which upon reading the recorded information of the tape directly controls the line casting machine in entirely automatic manner and at high operational rates. Machines heretofore available for producing such punched tapes have included some form of manually operable keyboard but operate "blind" in that they have no provision for reproducing typed copy from which typographical errors can be readily visually detected and the tape immediately corrected. Rather, it has been necessary for the operator to be highly proficient in reading all of the numerous combinational codes used in the tape recording so that he may readily read the tape codes to locate any typographical errors present. This procedure is not only time consuming and requires the availability of highly skilled operators, but generally necessitates that the correction of errors be effected by the fabrication and splicing of a corrected length of tape to replace that containing an error.

It is an object of the present invention to provide a new and improved justification-zone indicating counter which enables a punched tape to be produced with correct justification for control of line casting machines utilizing a wide range of type sizes and styles and which may use a large variety of spaceband models and makes.

It is a further object of the invention to provide a novel justification-zone indicating counter readily usable in punched tape perforators provided with an essentially standard office typewriter keyboard, thus enabling the fabrication of line casting machine control tapes by office typists needing a minimum of additional training or skill for the purpose.

It is an additional object of the invention to provide an improved justification-zone indicating counter suitable for incorporation into punched-tape recording electric typewriters using an essentially conventional keyboard and providing typed copy from which any typographical errors may be quickly noted and thereby enable immediate and easily effected correction to be made in a concurrently produced punched-tape recording. Thus the later use of the punched tape for automatic control of line casting machine operation enables exceptionally high accuracy to be attained in producing error-free printing slugs, and minimizes or eliminates any need to make proof copies of the slugs from which to discover and eliminate typographical errors.

It is yet a further object of the invention to provide a new justification-zone indicating counter which when incorporated into an electric typewriter having associated punched-tape reader and tape punch units enables a line casting machine control tape to be quickly and accurately duplicated automatically by use of another such punched tape or, by reference to concurrently typed copy automatically reproducing the information and line format of such other tape, to be reproduced with previously noted corrections or with revisions not appearing in the other tape.

Other objects and advantages of the invention will appear as the detailed description thereof proceeds in the light of the drawings forming a part of this application and in which:

FIG. 1 is a side elevational view generally illustrating an electric typewriter incorporating a justification-zone indicating counter embodying the invention;

FIG. 3 is a side elevational view, partly in cross section, illustrating in enlarged scale further details of the typewriter construction embodying the justification-zone indicating counter of the invention;

FIG. 3a illustrates an indicating scale carried by the carriage of the typewriter herein described;

FIG. 3b illustrates the construction of a left-hand marginal stop carried by the typewriter carriage;

FIGS. 4-8 are enlarged elevational views and detail cross-sectional views illustrating the construction of a carriage-supported cam plate and cooperating cam-actuated electrical contacts employed in the justification-zone indicating counter of the invention;

Figure 2A:
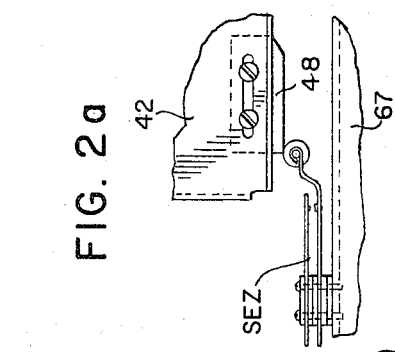
FIG. 2a is a fragmentary view illustrating the arrangement of one carriage-operated electrical contact used in the typewriter construction.
Figure 2:
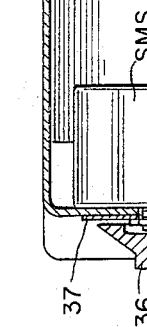
FIG. 2 is a plan view of a portion of the FIG. 1 typewriter and is used to illustrate constructional features of the justification-zone indicating counter.

Referring now more particularly to FIGS. 1-3, the justification-zone indicating counter of the present invention is shown as incorporated in an electric typewriter 10 which may have the general construction and operation disclosed and described in the above-mentioned Blodgett patents or in the Blodgett United States Patent No. 2,700,446. The typewriter is power driven in conventional manner by an electric motor, and supplies clutch-controlled cyclic power drive to a coded-information punched-tape reader unit 11 and a coded-information tape punch unit 12 forming integral subassembly unit structures of the typewriter. These units, and the manner of their drive from the typewriter, have constructions shown in detail in the above-mentioned Blodgett patents. A coded-information punched tape is transported in conventional manner through the punched-tape reader unit 11 to derive information recorded by the tape, and a manual knob 13 of the reader unit enables the position of the tape in the reader to be advanced or turned back by successive code-recording tape positions when desired. An unperforated tape is supplied to the punch unit 12 for punch code recording of information, and a manual knob 14 enables this tape also to be manually advanced or turned back by successive code-recording positions as may be occasionally desired in the production of a punched-tape recording.

A punched tape read by the reader unit 11 effects automatic operation of a code translator structure included in the typewriter 10 (having a construction and operation shown and described in the above-mentioned Blodgett patents) and power driven through a cycle control clutch from the typewriter drive motor. This code translator mechanically operates the key levers associated with the typewriter keys 15 and the word space bar of the typewriter to effect automatic typed reproduction of the content and format of printer copy recorded in the tape. The present typewriter construction includes two "dummy" key levers (having no associated manually operable keys) which are also mechanically operated by the code translator structure for a purpose hereinafter explained. The typewriter may, if desired, be also manually operated in conventional manner at any time when the punched-tape reader unit 11 is not operating.

The mechanical operation (either manually or automatically) of each key lever, the word space bar, functional control keys, and certain panel switches of the typewriter accomplish printing of copy with a desired format and concurrently effect operation of a code selector structure which is included in the typewriter and has a construction and operation generally shown and described in the above-mentioned Blodgett patents. The code selector is provided with numerous electrical contacts which are operated between closed-contact and open-contact positions, or between transfer contact positions in the case of the transfer type of electrical contact, under selector operational control. These selector contacts perform numerous functions, hereinafter described more fully, including control of the operation of the tape punch unit 12 to effect recording of successive coded alpha-nmeric characters and symbols and functional-control items of information in the paper tape transported through the punch unit. Certain selector contacts also control a differential escapement structure of the typewriter to effect character and inter-word spacing escapement of the usual typewriter carriage 16 during the typing of printed copy. This differential escapement structure is like that shown and described in the Blodgett Patents Nos. 2,700,421 and 2,700,447 except that the present typewriter structure includes an escapement arrangement having four electro-magnetically controlled escapement subassemblies rather than the three of the Blodgett patents. This enables escapement control of the carriage 16 in discrete steps selectably controlled to have any unit value between three units and fifteen units with one maximum step value of eighteen units as hereinafter explained more fully.

The typewriter carriage 16 is supported in conventional manner for reciprocal transverse movement by ball bearing raceways 17 and includes the usual end knobs 18 for manual rotation of a carriage platen 19 (FIG. 3) having associated longitudinally spaced sets of angularly disposed paper pressure rollers 20 and 21 with an associated pivoted paper guide plate 22 and a paper guide channel 23. The longitudinally spaced set of paper pressure rollers 21 are rotatably mounted on a shaft 24 supported at its ends by arms 25 pivoted on studs 26 provided on the carriage end walls 27 and 28. Secured to the pressure-roll supporting arms 25 are brackets 30 which support a scale 31, having scale increments shown more clearly in FIG. 3a, which in cooperation with a reference mark 32 on the usual fixedly positioned ribbon guide frame 33 indicates the reciprocal position of the carriage at any time.

Each scale increment of the scale 31 corresponds to three units of carriage escapement which, as mentioned above, occurs in discrete escapement steps having selectably controlled value by unit increments over a range of values from three to fifteen units with one maximum step value of eighteen units. This unit-valued escapement control of the typewriter carriage enables it to move according to the actual width of each alpha-numeric character or symbol typed. For the typewriter described herein, the carriage may move in unit-valued steps from a minimum of three units of escapement (although a minimum of six escapement units only is ordinarily required for the narrowest alpha-numeric characters or symbols such as the lower-case character $i$ or a period or comma punctuation mark) to a maximum of eighteen units of escapement corresponding to the width of the wider upper-case character M or W. The individual value of the discrete step of carriage escapement assigned to each alpha-numeric character or symbol is shown hereinafter in connection with FIG. 9 and FIGS. 10$i$–10$k$, and is selected in conformity with the unit valued widths conventionally assigned to the matrices used in line casting machines. The significance of this will be explained more fully hereinafter, but for the present it may be noted that the scale 31 of the carriage-cumulatively counts the total unit length of a typed line of alpha-numeric characters and symbols including inter-word spaces of preselected value. Thus the carriage with its scale 31 may be considered an accumulator means operative to accumulate the total unit length count of such typed line. This count is performed in a subtractive manner indicating the number of units remaining in a given length of line which terminates at a zero reference point on the scale 31 corresponding to a right-hand marginal line justification limit. Each line begins with maximum unit value at a left-hand line marginal limit established by the manual setting of a left-hand marginal carriage stop 38 which is adjustably positional along the usual carriage-supported margin-stop bar 34. The lower edge of the latter has relatively fine teeth 34$a$ (FIG. 3$b$) which are engaged by cooperating teeth 38$a$ of a spacer member 38$b$ having a width slightly more than the thickness of the bar 38 and which is secured, with another spacer member 38$c$, by machine screws 38$d$ between side plates comprising the carriage stop 38. These fine teeth of the bar 34 and spacer member 38$b$ enable left-hand marginal settings in unit values of carriage displacement. The adjustable stop 38 is positively locked in place by a toggle lever 39 pivoted at 39$a$ in the carriage stop 38 and having a turned over thumb engageable pressure portion 39$b$ to rotate the stop 38 into locking position where a tongue portion 39$c$ of the lever pressure engages the smooth upper surface of the bar 34. The position to which this left-hand marginal stop is manually set will be considered in more detail hereinafter.

The discrete unit-valued inter-word step escapement of the typewriter carriage may have any preselected value from three to nine units. Its precise value is preselected, for reasons presently to be explained, by manual setting of a double wafer seven-position rotary switch SMS which is conveniently mounted on the side of the rear cover 35 of the typewriter. The rotary shaft of this switch terminates in a knob 36 which may be manually grasped to set the switch to any word spacing value from three to nine as indicated by a dial 37.

Extending between the side plates 27 and 28 of the typewriter carriage are vertically displaced and end-threaded spacer rods 40 and 41. A mounting plate 42 of L-shaped cross section is secured upon the spacer rods 40 and 41 by inturned end brackets 43 and nuts 44 threaded on the rods 40 and 41 and enabling longitudinal adjustment of the positioning of the plate 42 on the carriage. The brackets 43 conveniently include studs 45 which anchor one end of helical wire springs 46 used to bias the paper table 22 in normal paper guiding position while enabling the paper table to be pivoted on its supporting arms 47 about the shaft 40 upon which the arms are supported. Secured on the rear face of the mounting plate 42, by machine screws 49, are guide members 50 which are spaced from the rear surface of the plate 42 by spacer members 51 and which engage grooves 52 provided in the side edges of a cam plate 53 detachably supported by the mounting plate 42 for reciprocal motion with the typewriter carriage.

As shown by the fragmental view of FIG. 2$a$, the forward lower surface of the mounting plate 42 has secured thereto a dependent cam member 48 which engages and actuates a roller pivotally supported on the end of the movable contact of a pair of electrical contacts SEZ. These contacts have a function described hereinafter in connection with the electrical control system of the typewriter, and are actuated to open contact position by the engagement of the cam member 48 with the movable-contact roller when the typewriter carriage moves one unit to the right of its zero right-hand marginal position.

As shown more clearly in FIGS. 4–6, the cam plate 53 has riveted thereto a stepped cam member 54. The cam plate 53 has a smooth sliding fit with the guide members 50, and is normally positioned with its lower edge engaging a backwardly turned longitudinal flange portion 55 of the mounting plate 42 as shown more clearly in FIG. 5. A plurality of such cam plates 53 are normally available for use, each plate having affixed thereto a stepped cam member 54 provided with ten cam steps positioned transverse to the direction of carriage movement and usually having uniform unit-valued step height in the direction of carriage movement. These available cam plates differ from one cam plate to another by the unit value of the step height employed for all or a majority of the steps of the stepped cam member 54 thereof. It may be mentioned in respect to this stepped cam member 54 that for special kinds of composition where the number of word spaces in a line is frequently reduced by reason of appreciable quantities of marginal indentations in a column of type, a safety factor may be introduced by increasing somewhat the unit step height of the first (or first several) cam steps with respect to that of the remaining steps so long as the increased step height falls within the expansion range of the available spacebands. The relation of step height to spaceband expansion range will be considered in more detail hereinafter. To permit ready interchange of the cam plates 53 in the guide members 50, each cam plate is provided with a wire bail handle 56, and is retained in position on the mounting plate 42 by a leaf spring detent member 57 riveted on the forward side of the mounting plate 42 and having a rounded terminating end portion 58 which extends through an aperture 59 of the mounitng plate 42 to engage an elongated groove 60 provided in the top front surface of the cam plate 53 as shown.

Toward the end of the typewriter carriage movement and as it approaches its right-hand zero marginal position, the cam steps of the stepped cam member 54 of the cam plate 53 engage individual ones of a plurality of vertically aligned cam rollers 63 of a cam-actuated contact structure 64 shown more clearly in FIGS. 7 and 8. The structure 64 is supported on a bracket 65 of U-shaped cross section having feet 66 secured by machine screws to the upper surface of a rear base plate 67 of the typewriter. As shown more clearly in FIG. 8, the cam-actuated contact structure 64 includes a back plate 69 and a front plate 70 both of insulating material. An edge positioned spacer bar 71 spaces the plates 69 and 70 along one edge thereof, and the edge positioned spacer bars 72 and the edge portion of a metallic contact plate 73 space the plates 69 and 70 along the other edge thereof. The plates 69 and 70 with the spacer members 71 and 72 and the contact plate 73 are maintained in assembled relation by machine screws 74, an insulating sleeve 75 providing electrical insulation for the spacer member 72 and the contact plate 73.

The contact plate 73 is slotted longitudinally to provide ten integral contact blades 76 having contact inserts 77 affixed to their ends in opposing relation to individual ones of a vertical row of fixed contacts 78 extending through apertures 79 of the back plate 69 and riveted to electrical terminals 80. The cam rollers 63 are pivotally supported upon stud shafts 81 secured between the upstanding arms of a U-shaped supporting bracket 82 spot welded to the surface of individual ones of the contact blades 76. As shown in FIG. 8, the cam rollers 63 extend through individual ones of a row of aligned apertures 83 provided in the front plate 70 and also extend through individual ones of a row of aligned rectangular apertures 84 provided in a metallic face plate 85 riveted in a transverse groove 86 of the front plate 70 as shown.

Upon engagement of a step of the stepped cam member 54 with an individual one of the cam rollers 63, the roller 63 is deflected counterclockwise as seen in FIG. 8 and thereby bends its associated contact blade 76 to engage the contact insert 77 of this blade with the opposing fixed contact member 78. This completes an electrically continuous circuit from the associated contact terminal 80 through the contact plate 73 and the spacer members 72 to a terminal end portion 88 (FIG. 7) of one spacer member 72. Each cam roller 63 when thus individually deflected remains in its deflected position for all further movement of the typewriter carriage toward its right-hand position. The contact pairs of the cam-actuated contact structure 64 are identified in FIG. 7 as contacts LLS–1 through LLS–10, and it will be noted that movement of the cam plate 53 with movement of the typewriter carriage toward its right-hand marginal zero position effects closure of the contact pairs in order from the contact pair LLS–10 toward the contact pair LLS–1.

The manner of using the typewriter just described, with that portion of its justification-zone indicating counter thus far considered, will now be briefly described. It should be borne in mind that it is a principal function of the typewriter to create a punched-paper tape useful in providing automatic control of a line casting machine. Such automatic control has been made possible in recent years by using, in automatically controlled line casting machines, matrices having assigned widths which are integral multiples of $\frac{1}{18}$ the width of the upper-case character M (this width as measured in fractions of an inch being conventionally referred to as the em size or em quad size of the type). These matrices widths are assigned different values according to the width of each particular alphabetic letter or numeral or symbol, but the value assigned remains the same for any physical size of type to be used at any given time so that only the physical length of an alphabetic line of type varies with type size. Any given physical length of a line of type is expressed in picas, one pica having the value 0.166044 inch. Thus one need know only the size of the type em in order to calculate the number of ems in a line of given pica measure. Since as just explained matrices for automatic control of line casting machines are assigned widths which are multiples of $\frac{1}{18}$ the em width in any given size of type, it is convenient also to express picas in length in terms of the number of unit widths of type of given em size. For example, a line of 20 picas width using type having an em size of 0.0846 inch will have 705 units of width. This is easily verified by the following relation $$\text{units} = \frac{\text{line length} \times 0.16604 \text{ (inch per pica)} \times 18 \text{ (units per em)}}{\text{em quad size in inches}}$$

The unit value of line length thus computed is rounded off to the nearest whole number below which is divisible by 3, since the margin rack of the present typewriter is notched every three units as indicated by the scale indicia of FIG. 3a previously described. Accordingly upon computing the unit length of a given line in picas for a given em quad size in inches, the left-hand marginal stop of the typewriter carriage is manually set to place this unit value of line length opposite the corresponding numbered indicia of the carriage scale 31 illustrated in FIG. 3a when the carriage is moved to the left-hand margin position.

It was previously explained that the line casting machine justifies a line of matrices by uniform expansion of each spaceband used in the matrix assembly. Numerous models and makes of spacebands are readily available for this purpose, and it is frequently desirable to select a particular mode and make of spaceband for a particular size of type. A typical spaceband marketed by the Linotype Corporation is their model J–3572 which has a minimum width of 0.0369 inch and a maximum expansion to 0.1219 inch. The minimum spaceband width is computed in units by the relation $$\frac{\text{minimum word}}{\text{space units}} = \frac{\text{minium spaceband thickness in inches} \times 18}{\text{em quad size in inches}}$$

For example, an em size of 0.1106 inch divided by the numeral 18 gives 0.00614 as the inch size of one unit in this particular size of type. Assuming use of the typican spaceband just mentioned and having a minimum spaceband thickness of 0.0369 inch, this thickness divided by 0.00614 gives a quotient of 6.01 units as the minimum thickness of the spaceband. In using this computed minimum spaceband thickness in units, the computed value is rounded off to 7 units as the next whole unit value which avoids any possibility of a tight line on the line casting machine. This rounded off computed minimum spaceband value is used in manually setting the switch SMS (FIG. 1) to provide the minimum units of interword spacings.

The unit value of the expansion potential of the selected spaceband is then computed by using the following relation:

$$\frac{\text{maximum}}{\text{expansion units}} = \frac{[(\text{expansion range}) \, 0.85 + \text{minimum expansion}] \times 18}{\text{em quad size in inches}}$$

Thus assuming the use of the spaceband used in the previous example and having a 0.1219 inch maximum thickness and a 0.0369 inch minimum thickness, the net expansion or expansion range in inches for this spaceband is 0.085 inch. The line casting machine can be relied upon to use 85% of this expansion, or 0.0722 inch. The maximum amount of space to be taken by the spaceband will then be the minimum spaceband width of 0.0369 plus the usable expansion of 0.0722 inch which equals 0.1091 inch. This value converted to units equals 17.76 units which is rounded off to 17 units (the next lowest whole unit value) so that there will be no danger of a loose line being set on the line casting machine.

Since in the foregoing example seven of the seventeen available expansion units are used for each spaceband in the matrix assembly, the net expansion available is seventeen minus seven or ten units. This net expansion unit value establishes the unit depth of the steps of the cam plate stepped cam member 54 (the step depth as previously noted being measured in the direction of cam plate motion and being, usually although not necessarily, uniform for each of the ten steps). It has been found in practice that the use of ten cam plates having step depths varying by unit differences from a minimum value of six units to a maximum value of fifteen units is adequate to take account of the greater number of available makes and models of spacebands most often used. The demountable support of the cam plate 53 on the mounting plate 42 enables ready replacement of one cam plate with another.

As will presently be explained in connection with the electrical circuit diagram of FIG. 10, the function of the cam plate 53 in controlling the contact assembly 64 is to light a justification-zone indicating light on the typewriter as soon as the typewriter carriage has moved to a position within the justification zone. The width of this zone increases with the number of word spaces in the composed line of copy since there are a correspondingly larger number of spacebands to insure justification of an assembled line of matrice and spacebands in a line casting machine. Thus, by way of example, a cam plate having a step depth of say nine units provides a nine unit justification-zone indication when one word space is used in a line of copy and provides nine additional units of justification-zone width for each additional word space up to a maximum of ten word spaces (ninety unit justification-zone width) in the line of copy. Upon illumination of the zone justification light of the typewriter, the operator may quickly ascertain the units of length remaining in the line as indicated by the scale 31 of FIG. 3a. The operator is thus able readily to determine whether the word then being type can properly be hyphenated, or even whether one or more words may perhaps be added while the typewriter carriage remains in the justification zone at a position to the left of its zero justification margin.

Upon completing the manual typing of one line of copy and actuating the carriage return key of the typewriter, a carriage return code is automatically recorded by the tape punch unit 12 (FIG. 1). This is immediately followed by the automatic recording of either a paper feed code, if there has been no word space or quad code previously recorded during composition of the line, or by an elevate code if there has been either a quad code or one word space recording during composition of the line. A paper feed code thus recorded is ignored when read by the reader of the line casting machine, but the elevate code controls the line casting machine to elevate an assembled line of matrices to line casting position as previously explained.

During creation of a new punched tape by the tape punch unit 12 (FIG. 1) from a punched tape read by the reader unit 11, the typewriter automatically types the information and format of copy recorded in the read tape. If this reproduced copy evidences a typographical error recorded in the tape passing through the tape reader, the latter may be manually halted by operation of a stop switch on the panel of the typewriter. The corresponding error recorded in the newly punched tape can be immediately corrected by backing up the punched tape to the erroneous code (accomplished by manual manipulation of the knob 14 provided on the punch unit 12), by similarly backing up the tape passing through the reader (by manual manipulation of the reader knob 13) to position the tape just beyond the typographical error recording noted, by deleting the typographical error just recorded in the newly punched tape and all recordings thereafter, by manually operating the typewriter to correct the typographical error, and by thereafter depressing a start read switch on the panel of the typewriter to continue the tape reader operation. In similar manner, new matter may be inserted into the tape in process of fabrication by similarly halting the tape reader and manually inserting the new matter by manual operation of the typewriter keys. Thereafter the tape reader may be again placed into operation by manual actuation of the panel start read switch. If the newly inserted matter replaces a quantity of information recorded in the tape read by the tape reader unit, the same procedure is followed except that the tape is advanced in the tape reader past the information to be replaced and the reader unit is then once more placed into operation. In these instances, however, the newly inserted matter ordinarily will change the line length of all following matter read from the tape until completion of a paragraph. This requires that the typewriter be manually operated to effect correct line justification, while at the same time manually advancing the tape in the tape reader unit 11 (by manual manipulation of the tape reader knob 13) past carriage return and line space or elevate codes recorded in the tape. This procedure will be followed to completion of the paragraph, after which automatic operation under control of the tape reader unit 11 may continue without interruption.

Figure 9:
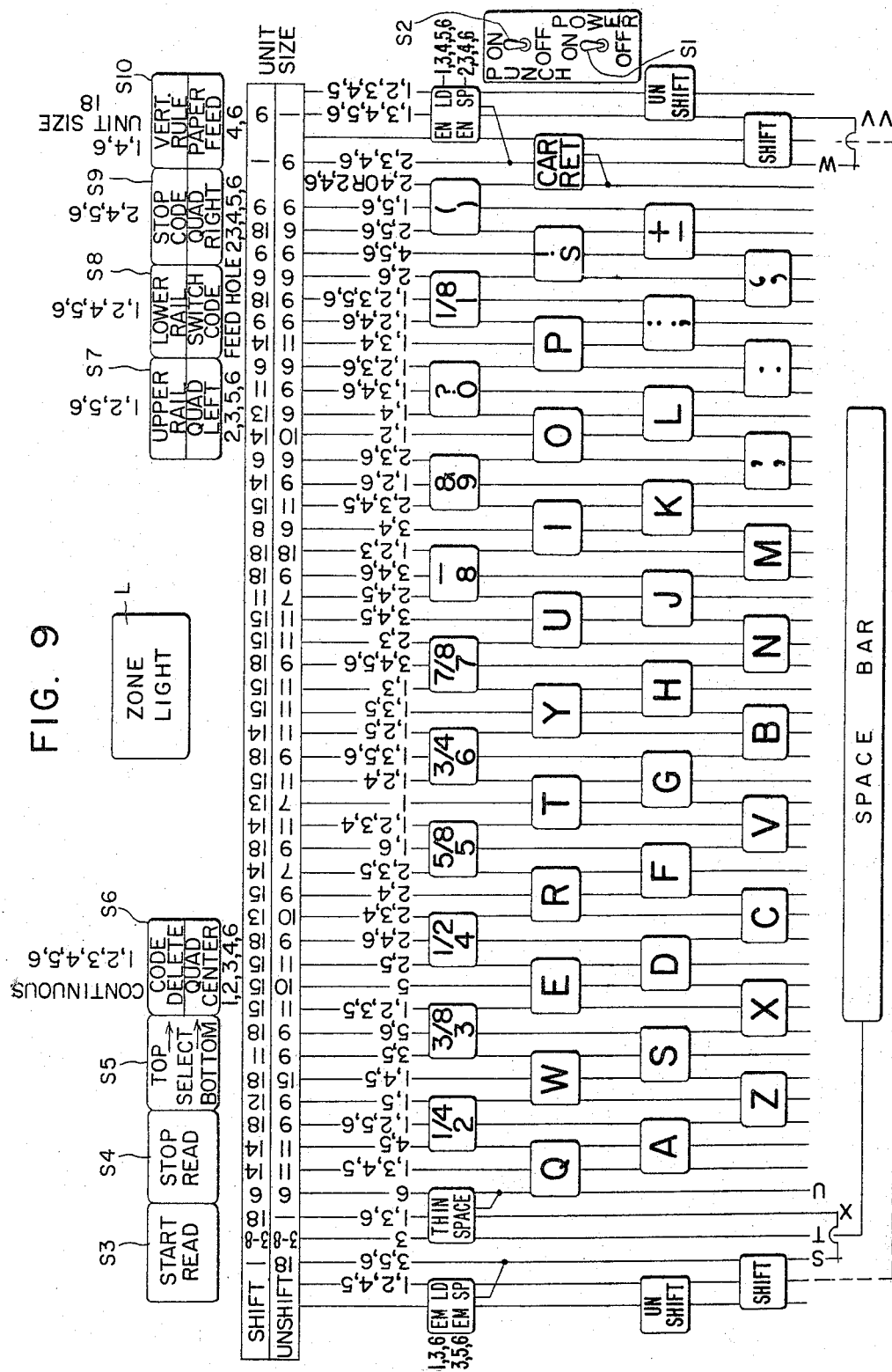
FIG. 9 illustrates the keyboard layout of a typewriter having the construction herein described.

The typewriter keyboard layout and arrangement of the punch ON-OFF toggle switch S2, the power ON-OFF toggle switch S1, the panel switches S3–S10, and the location of the zone indicating light L is illustrated in FIG. 9. It will be noted that the alpha-numeric and symbol keys are in four banks with alphabetic, numeral, and punctuation positioning very similar to that of a standard office typewriter. The thin space key, the EM LD–SP key, and the EN LD–SP keys are special to the art of type setting and accomplish the functions herein described. It will be noted that a dummy key lever X (having no associated manually operable key) has a mechanical bridge connection to the key lever S. Thus a 1-3-6 code read by the tape reader will effect mechanical operation of the key lever X and the bridging connection to the key lever S will effect concurrent mechanical operation of the latter key lever. This provides recording of an em leader code 1-3-6 in the upper-case position of the typewriter, whereas a 3-5-6 code read by the tape reader will effect mechanical operation of the key lever S only to record an em space code 3-5-6 (the typewriter carriage being spaced eighteen units in each case). It will similarly be noted that there is a dummy key lever VV having a mechanical bridging connection to the key lever W. Thus a 1-3-4-5-6 code read by the tape reader will effect mechanical operation of the key lever VV and the bridging connection will then effect concurrent operation of the key lever W to record an en leader code 1-3-4-5-6 in the upper-case position, whereas a 2-3-4-6 code read by the tape reader will effect operation only of the key lever W to effect recording of an en space code 2-3-4-6 in the lower-case position (the typewriter carriage being spaced nine units in each case). A 3-6 code read by the tape reader will cause the code translator to effect concurrent mechanical operation of the thin space key lever U and the space bar lever T even though there is no mechanical bridging connection between these levers. It will be understood that the codes shown in association with each key lever, and in association with the several panel switches, is merely illustrative of one suitable code which may be used in practice.

Figure 10A:
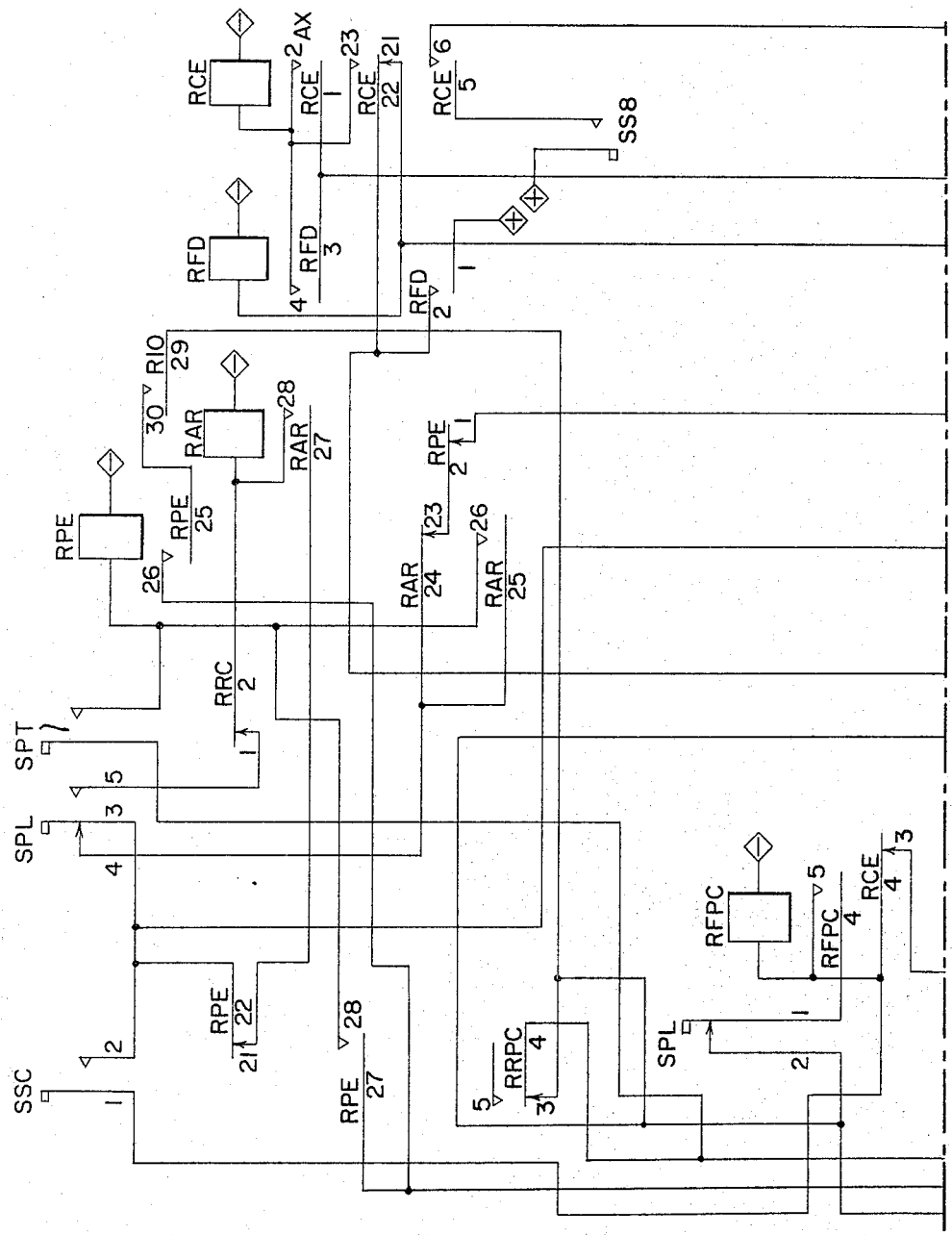
FIGS. 10a–10l arranged as in FIG. 10 show the electrical circuit arrangement of the typewriter control system incorporating the justification-zone indicating counter of the present invention.
Figure 10C:
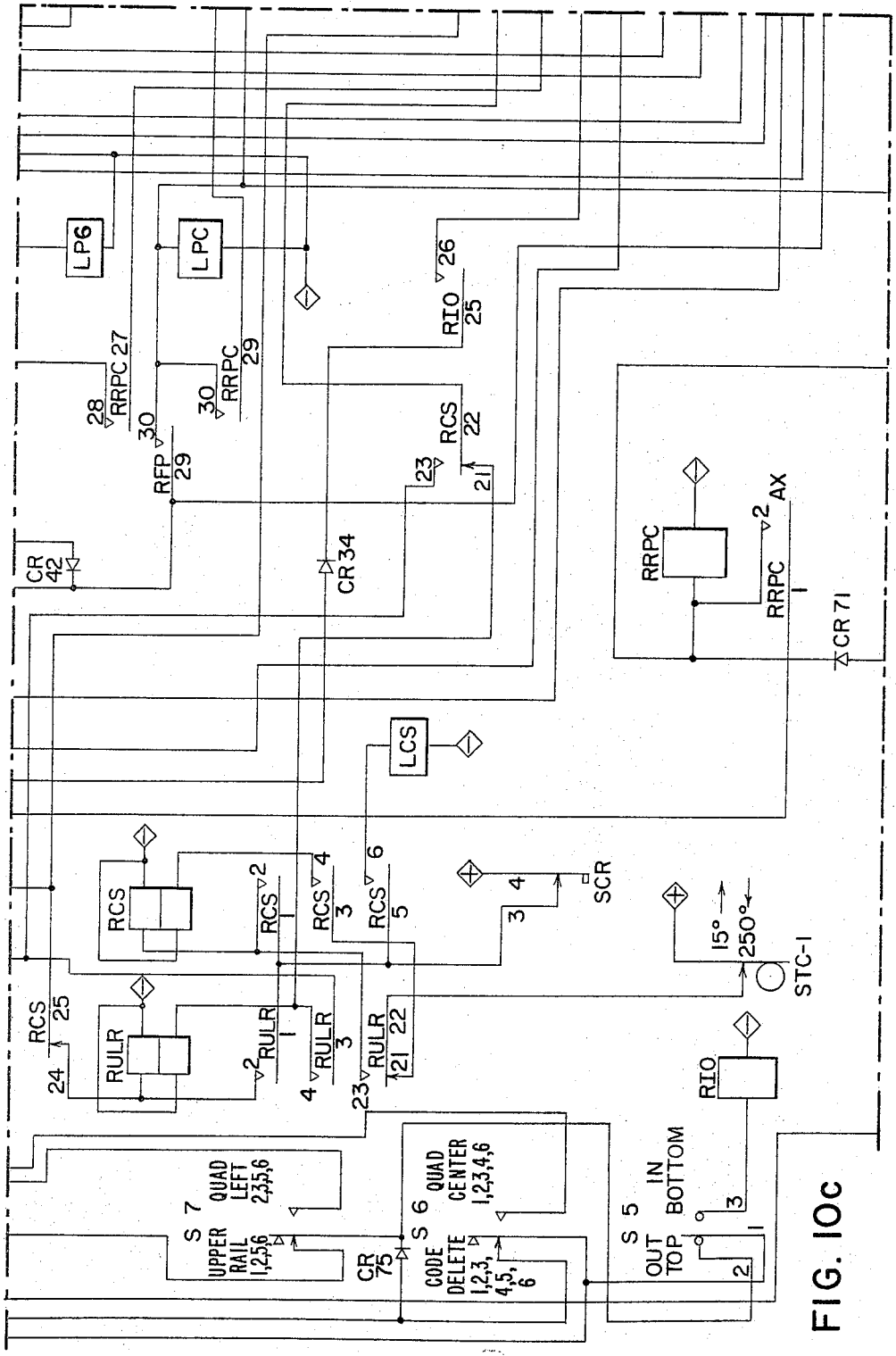
Figure 10D:
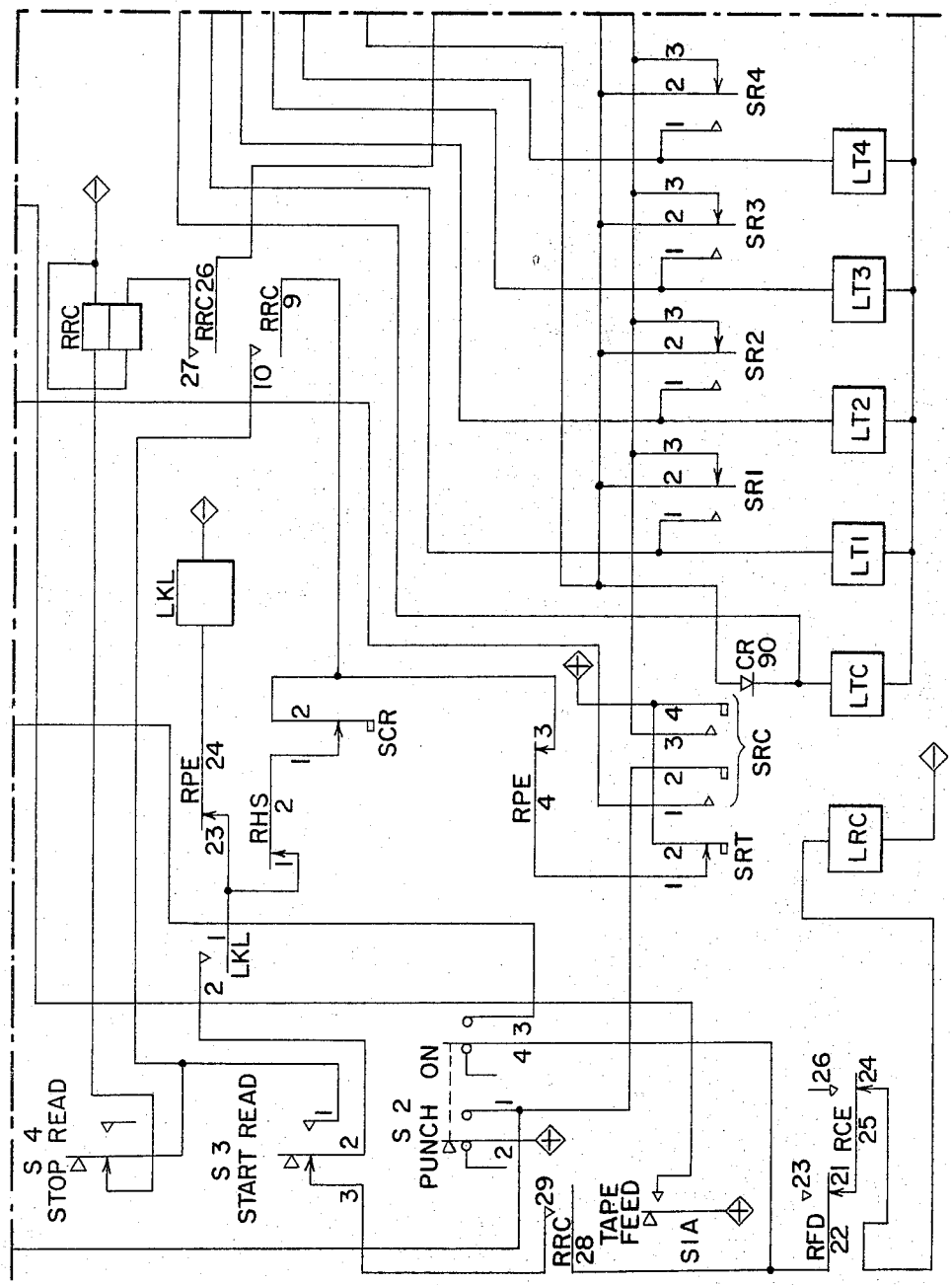
Figure 10E:
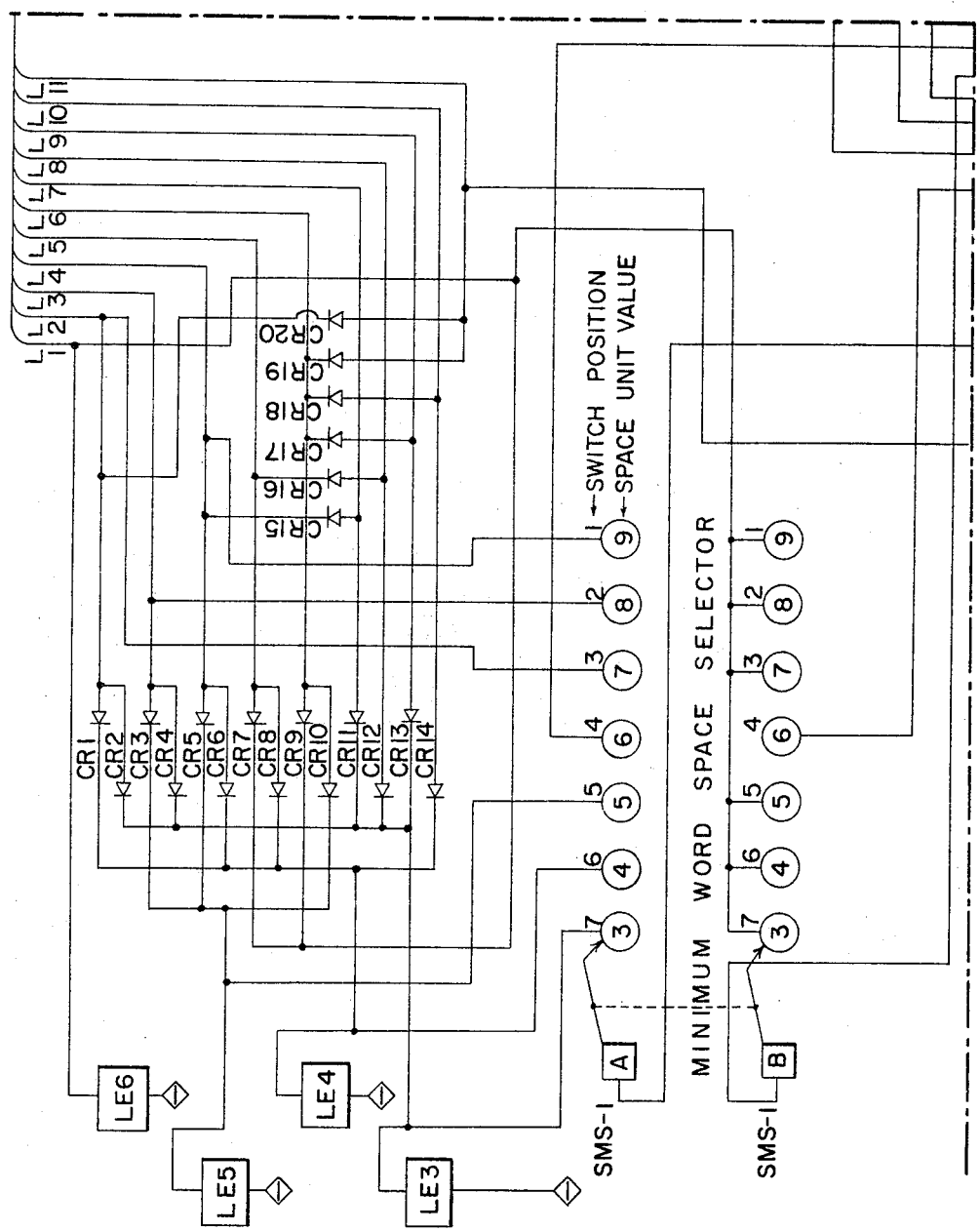
Figure 10F:
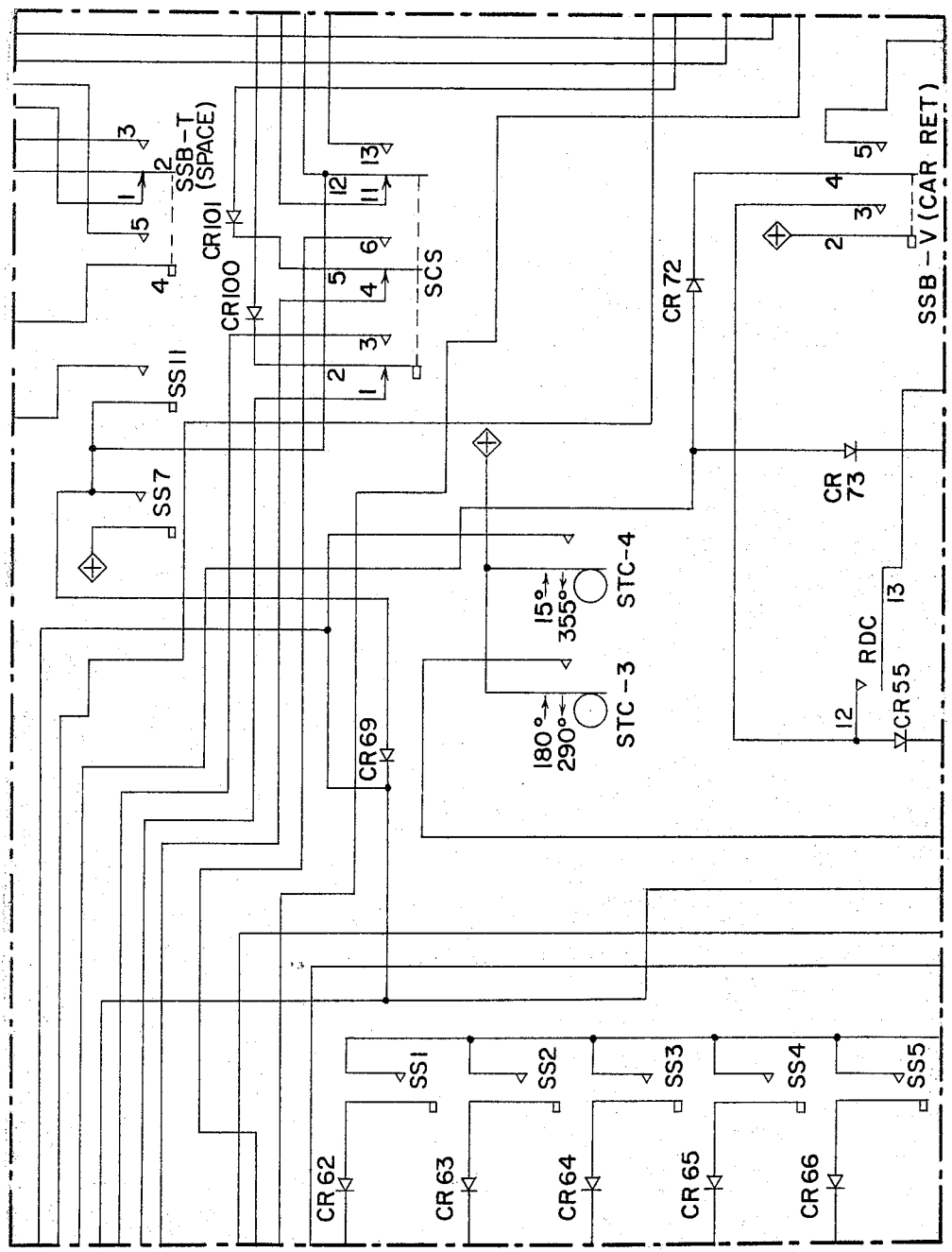
Figure 10G:
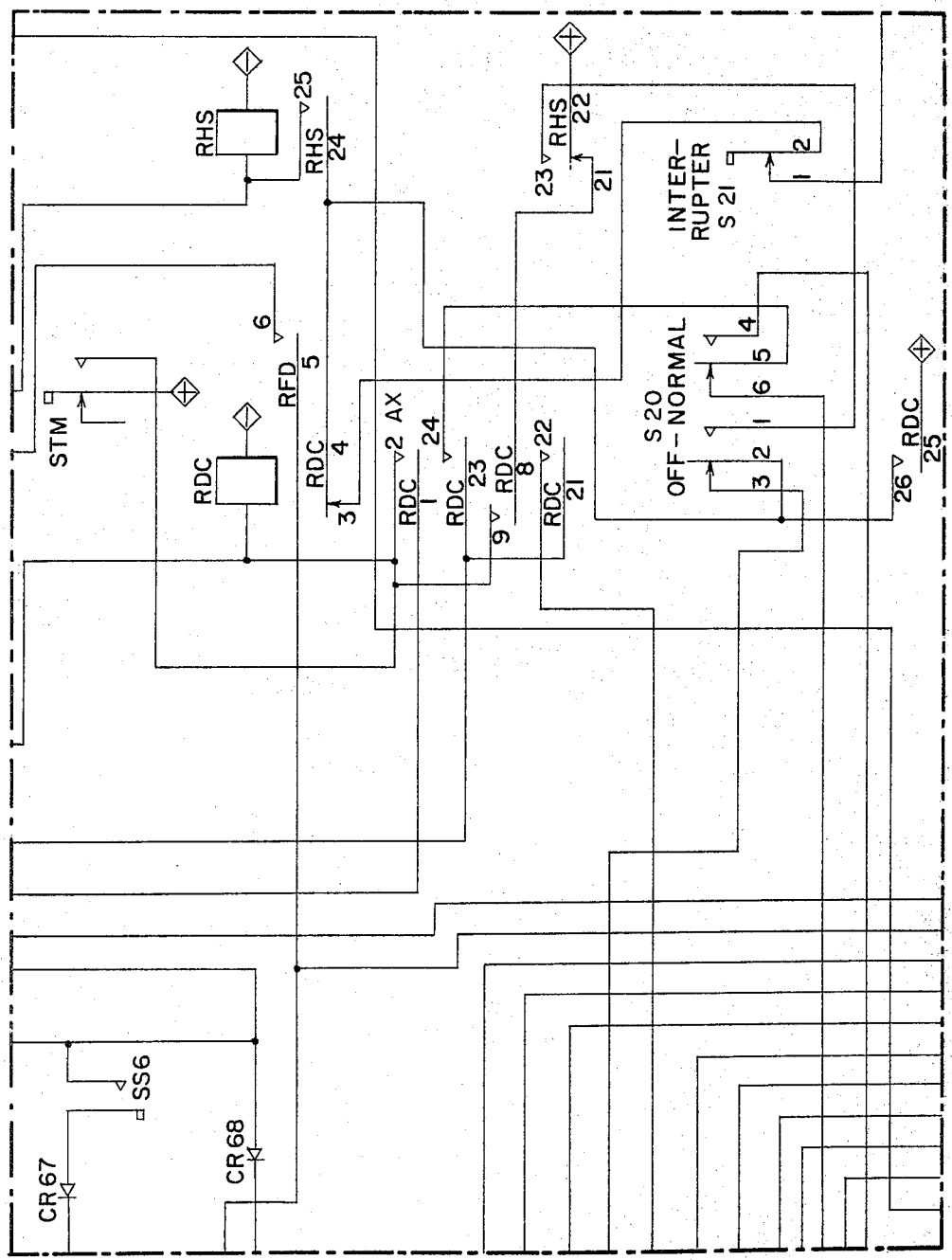
Figure 10H:
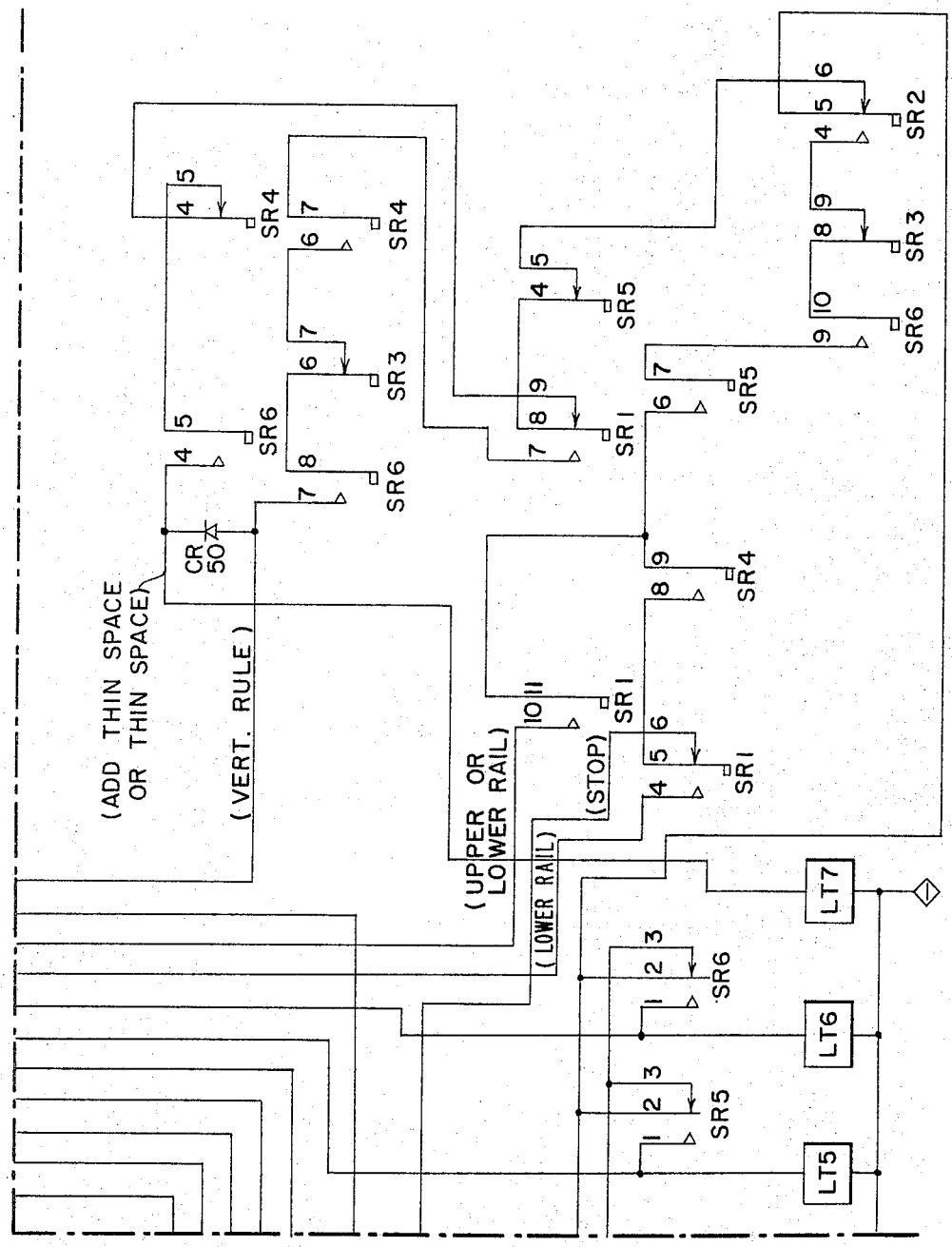
Figure 10I:
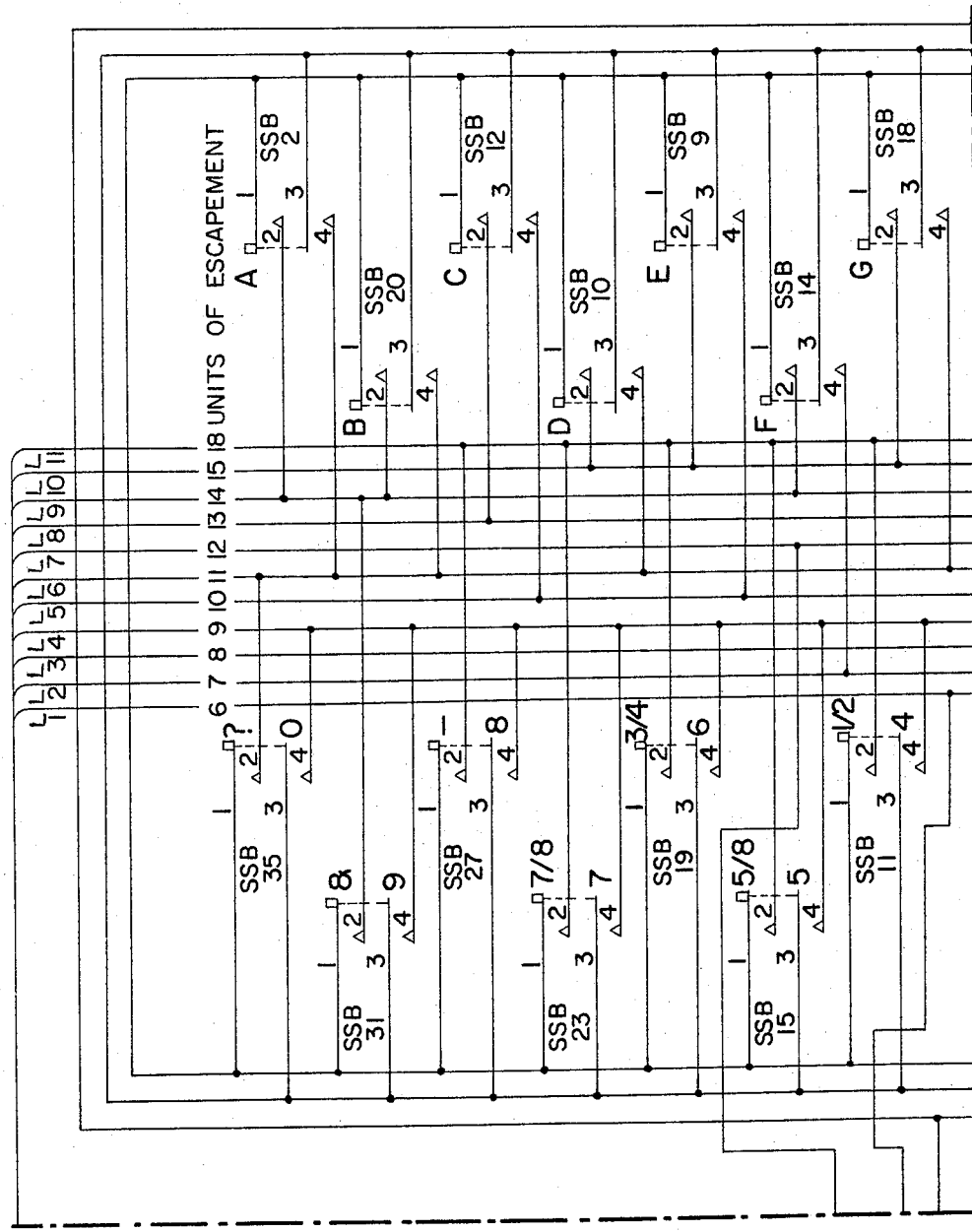
Figure 10J:
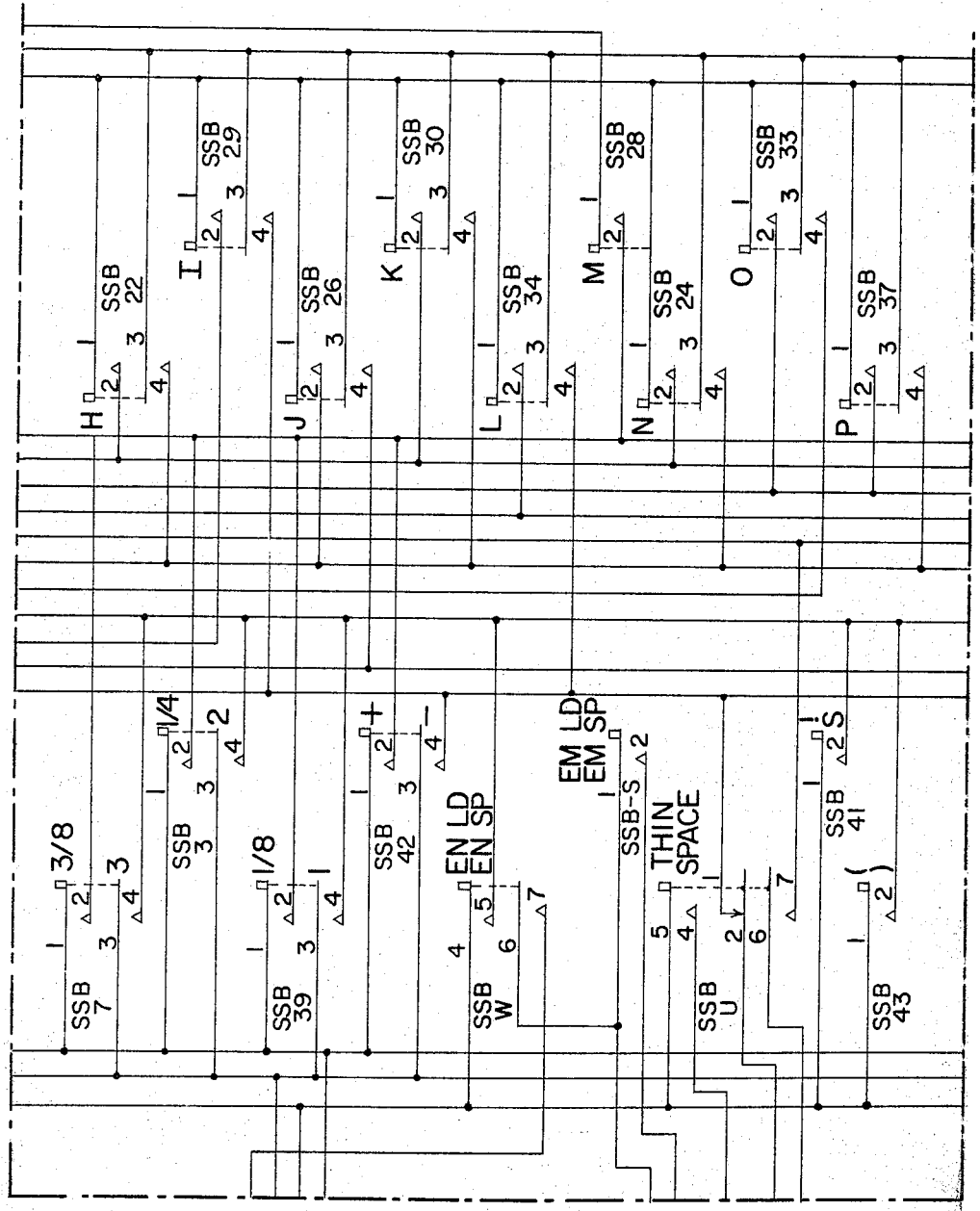
Figure 10K:
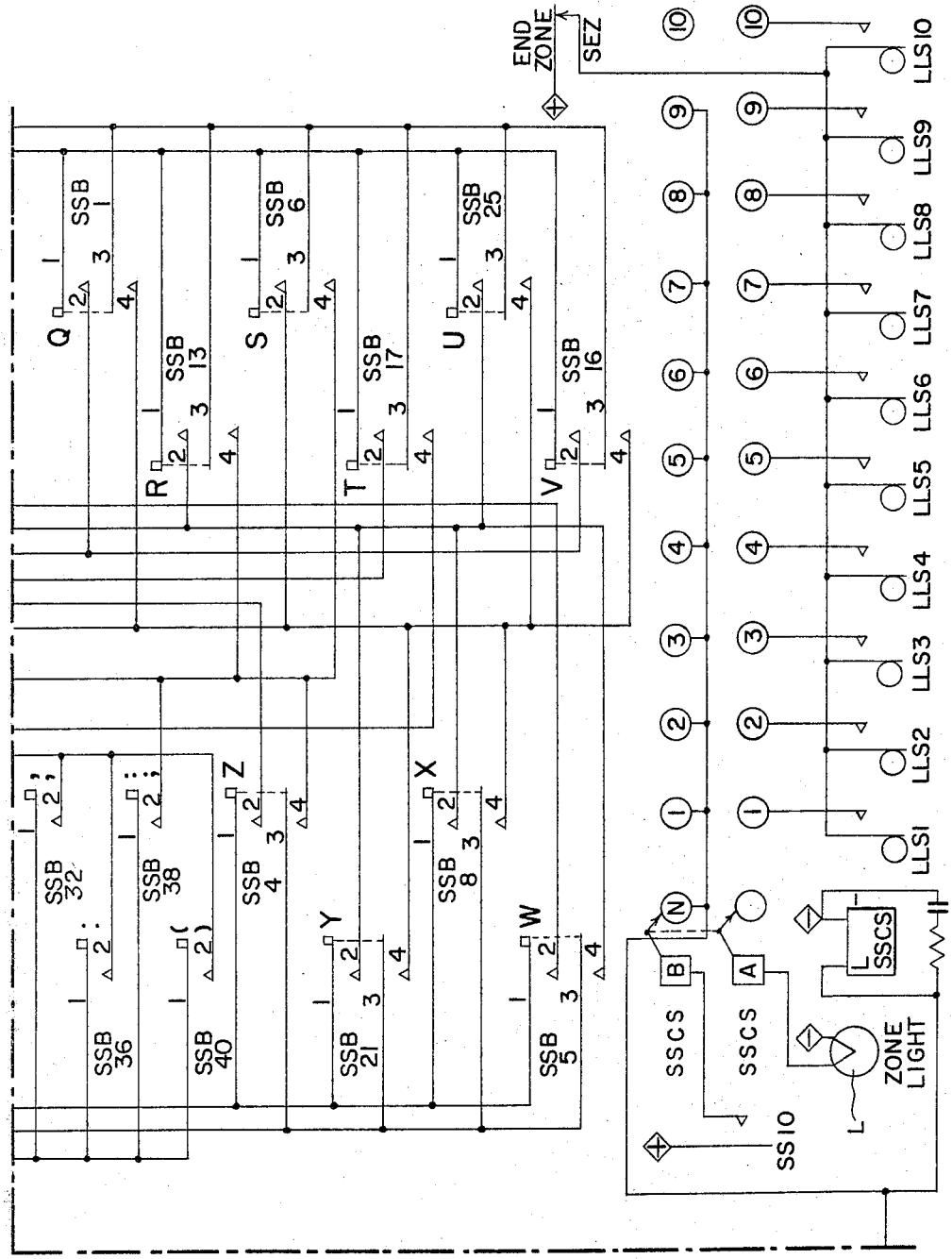
Figure 10:
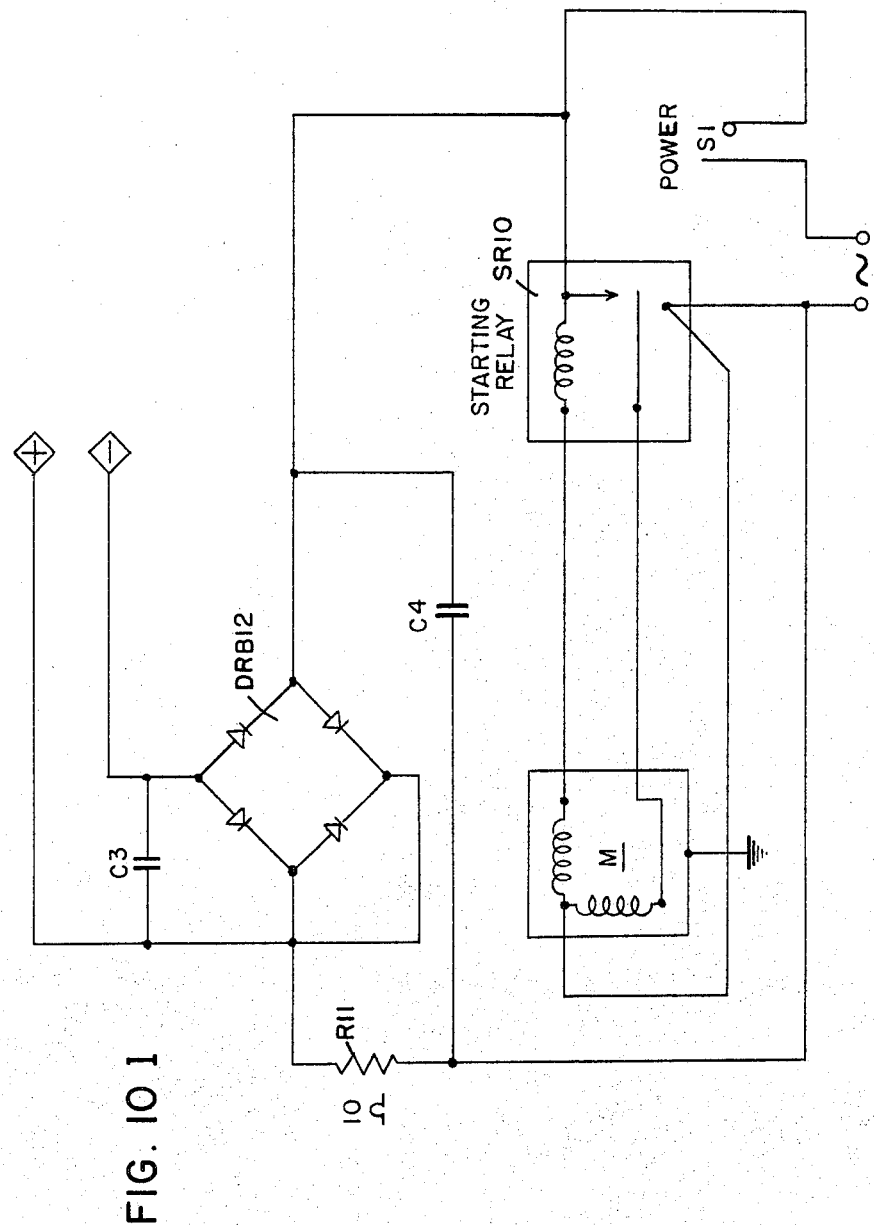

The electrical control system of the typewriter is shown in FIGS. 10a–10l arranged as in FIG. 10.

The power switch S1 (FIG. 10l) is of the type which maintains its contacts either closed or open according to whether the switch is manually operated respectively to contact-closed position or to contact-open position. Upon manual operation of the switch S1 to close its contacts, alternating current power is supplied through a starting relay SR10 to energize an alternating current motor M which supplies drive power to operate the typewriter in a manner conventional in electrically operated typewriters. Alternating current is also supplied through a current limiting resistor R11 to a bridge diode rectifier system DRB12 to develop unidirectional energizing power which is filtered by the condensers C3 and C4 and which energizes the positive and negative terminals shown throughout the electrical control system.

Upon energizatoin of the electrical system with unidirectional power as last described, a key lock magnet LKL (FIG. 10d) is energized through normally closed contacts 23 and 24 of a relay RPE, normally closed contacts 1 and 2 of a relay RHS, normally closed contacts 1 and 2 of carriage return contacts SCR (which open during each carriage return operation of the typewriter), normally closed contacts 3 and 4 of the relay RPE, and normally closed tape-reader contacts SRT which are closed by the presence of tape in the tape reader unit in readiness to be read by the latter. Energization of the key lock magnet LKL unlocks the key levers of the typewriter to permit their manual and automatic operation.

Manual operation of the punch ON switch S2 to close its normally open contacts (the switch S2 remains in the ON or OFF position to which it is manually set) energizes a front panel control relay RFPC (FIG. 10a) through normally closed contacts 3 and 4 of a relay RCE, normally closed and serially connected contacts of manually operable switches S7–S10, either a diode rectifier CR75 and normally closed contacts of a manually operable switch S6 or closed contacts 1 and 2 of a manually operable switch S5, normally closed contacts 3 and 4 of a relay RRPC, and the now closed contacts 1 and 2 of the punch ON switch S2. The relay RFPC is normally maintained energized except during a punch cycle of operation through its now closed contacts 4 and 5, the contacts 1 and 2 of a punch latch contact assembly SPL (which open during a punch cycle) of the tape punch unit, the normally closed contacts 3 and 4 of the relay RRPC, and the now closed contacts 1 and 2 of the punch ON switch S2. It is the function of the relay RFPC to prevent more than one punch-code recording to be effected by each manual operation of the switches S7–S10 or by each manual operation of the switch S6 when the contacts 1 and 3 of the switch S5 are closed. To this end, the earlier-traced direct energizing circuit of the relay RFPC is interrupted by manual operation of any of the switches S7–S10 and its hold energizing circuit is interrupted when the punch unit cycles to open the contacts 1 and 2 of the punch latch contact assembly SPL. The relay RFPC normally open contacts 24 and 25 (FIG. 10b) are thus closed prior to each punch unit cycle but not after such cycle has started and these contacts control the energization of a relay RFP which is required to be energized to effect the recording of a code by manual operation of any of the switches S7–S10. This is true also for the manually operable switch S6 when the switch S5 is operated to close its contacts 1 and 3, but the direct energizing circuit of the relay RFPC is maintained around the contacts of the switch S6 when the switch S5 is operated to close its contacts 1 and 3 so that for this condition successive delete codes will be recorded by the punch unit as long as the switch S6 is manually held in operated position.

The manually operable switch S5 is of the type which remains in the position to which it is set either to close its contacts 1 and 2 or to close its contacts 1 and 3. When manually operated to close its contacts 1 and 3, the switch S5 energizes an in-out relay RIO which in its energized and deenergized states enables the manually operable spring-return switches S6–S10 each to perform either of two different functions as will presently be explained more fully.

The manually operable switch S6, of the spring return type, may be manually operated to close its normally open contacts and cause the punch unit (1) to record a delete code 1–2–3–4–5–6 when the relay RIO is deenergized or (2) to record a quad center code 1–2–3–4–6 when the relay RIO is energized. A delete code is ignored by the tape reader of the line casting machine, but a quad center code operates the automatic quadder of the line casting machine to center a line of type between the left and right margins of the type column. Assume for the moment that the relay RIO is deenergized. The movable contact of the switch S6 receives energization from the now closed contacts of the punch ON switch S2 through the relay RFPC energizing circuit earlier traced, and manual operation of the switch S6 energizes a front panel relay RFP. This energizing circuit includes the normally closed contacts 6 and 7 of the punch latch contact assembly SPL, normally closed contacts 23 and 24 of the relay RIO, a diode rectifier CR39, a diode rectifier C41, a diode rectifier CR42, normally closed contacts 5 and 6 of a relay RPE and the now closed contacts 24 and 25 of the relay RFPC.

The relay RFP contacts 6 and 7 now close to energize a punch magnet LP1 through a diode rectifier CR24 from the energizing circuit of the relay RFP; contacts 8 and 9 of the relay RFP close to energize a punch magnet LP2 through a diode rectifier CR31 from the energizing circuit of the relay RFP; contacts 21 and 22 of the relay RFP close to energize a punch magnet LP3 through a diode rectifier CR74 and a diode rectifier CR27 from the energizing circuit last mentioned; contacts 23 and 24 of the relay RFP close to energize a punch magnet LP4 through a diode rectifier CR37 and a diode rectifier CR28 from the relay energizing circuit; relay RFP contacts 25 and 26 close to energize a punch magnet LP5 through a diode rectifier CR40 from the relay energizing circuit; contacts 27 and 28 of the relay RFP close to energize a punch magnet LP6 through a diode rectifier CR41 from the relay energizing circuit; and contacts 29 and 30 of the relay RFP close to energize a punch clutch magnet LPC from the relay energizing circuit. Energization of the punch clutch magnet and punch magnets as last described effect punch recording of a delete code as long as the switch S6 is maintained manually actuated to close its normally open contacts.

If the relay RIO should be energized at the time the switch S6 is manually actuated to close its normally open contacts, a quad center code 1–2–3–4–6 is punched by the punch unit as follows: the front panel relay RFP is again energized in the same manner as last described but with the contacts 6 and 7 of the punch latch contact SPL shunted by the now closed contacts 27 and 28 of the relay RIO; the punch magnet LP1 is energized through contacts 6 and 7 of the relay RFP and the diode rectifier CR24; the punch magnet LP2 is energized through the contacts 8 and 9 of the relay RFP and a diode rectifier CR26; the punch magnet LP3 is energized through a diode rectifier CR74, contacts 21 and 22 of the relay RFP, and a diode rectifier CR27; the punch magnet LP4 is energized through contacts 23 and 24 of the relay RFP and diode rectifiers CR28 and CR37; the punch magnet LP6 is energized through contacts 27 and 28 of the relay RFP and the diode rectifiers CR28 and CR36; the punch magnet LP5 is not energized at this time due to the now open contacts 23 and 24 of the relay RIO; and the punch clutch magnet LPC is now energized as before through the now closed contacts 29 and 30 of the relay RFP.

Thus it will be seen that the manually operable switch S6 effects punch recording of a delete code 1–2–3–4–5–6 or a quad center code 1–2–3–4–6 depending upon the respective deenergized or energized states of the relay RIO under control of the switch S5.

The movable contact of the manually operable spring-return switch S7 is energized from the energizing circuit earlier described as extending through the now closed contacts 1 and 2 of the punch ON switch S2. Manual actuation of the switch S7 to close its normally open contacts causes the punch unit to record an upper rail code 1–2–5–6 or a quad left code 2–3–5–6 depending upon the respective deenergized or energized states of the relay RIO. As is well known, an upper rail code causes the lower character on the matrix in the line casting machine to cast (this lower character is usually either an italic or boldface form of character depending upon the particular font in use at the time). The quad left code causes the line casting machine to operate its quadder and align the first character of a line of type at the left hand margin of the column of type. Assume for the moment that the relay RIO is deenergized. Manual actuation of the switch S7 energizes a relay RULR through normally closed contacts 6 and 7 of the relay RIO and the normally closed contacts 24 and 25 of the relay RCS. The relay RULR maintains itself energized through its now closed contacts 1 and 2 and through contacts 3 and 4 of the carriage return contact assembly SCR. A color shift ribbon relay RCS is now energized through the now closed contacts 22 and 23 of the relay RULR and the normally closed cam actuated contacts STC–1 of the typewriter code translator structure. The relay RCS maintains itself energized through its now closed contacts 1 and 2 and the normally closed contacts 3 and 4 of the carriage return contact assembly SCR.

The now closed contacts 5 and 6 of the color shift relay RCS energizes a ribbon color shift magnet LCS through the normally closed contacts 3 and 4 of the carriage return contact assembly SCR. The ribbon shift magnet LCS upon becoming energized shifts the typewriter ribbon at the print zone to cause the characters of the typewriter to be printed in red, and this occurs for the remainder of the line or until a lower rail switch S8 is manually actuated. The front panel relay RFP is again energized through the diode rectifiers CR42 and CR41 and a diode rectifier CR38 from the switch S7. The upper rail code 1-2-5-6 is recorded by the punch unit by energization of the punch magnets LP1, LP2, LP5, LP6, and the punch clutch magnet LPC through now closed contacts of the relay RFP and various diode rectifiers including a diode rectifier CR23 as shown.

The same operation prevails when the relay RIO is energized except that a quad left code 2-3-5-6 is punched by transfer of the contacts 6-8 of the relay RIO and by which to energize through a diode rectifier CR32, the punch magnet LP3 instead of the punch magnet LP1. Since the energizing hold circuits of the relays RULR and RCS extend through the normally closed contacts 3 and 4 of the carriage return contact assembly SCR, these relays and the ribbon shift magnet LCS are all deenergized upon the next carriage return operation of the typewriter. The printed copy of the typewriter thereupon automatically changes from red to black.

Manual actuation of the switch S8 causes the punch unit to record a 1-2-4-5-6 lower rail code or merely to punch a feed hole code depending upon whether the relay RIO is respectively deenergized or energized. A lower rail code when read by the tape reader of the line casting machine causes the type matrices to be assembled on the bottom rail of the assembling mechanism of the machine; hence the upper character (usually roman) of the matrices are now cast. Assuming for the moment that the relay RIO is deenergized, manual operation of the switch S8 applies energization (received through the now closed contacts 1 and 2 of the punch ON switch S2) through the normally closed contacts 3 and 4 of the relay RIO and now closed contacts 3 and 4 of the relay RULR (the lower rail code always following an upper rail code with consequent energization of the relays RULR and RCS as described earlier) to reverse energize the relay RULR and thereby effectively deenergize this relay. When the contacts 21 and 22 of the relay RULR now close, reverse energization is applied to the ribbon color shift relay RCS through its now closed contacts 3 and 4 of the cam actuated contacts STC1 of the translator structure thereby effectively to deenergize the relay RCS. This likewise deenergizes the ribbon shift magnet LCS since the contacts 5 and 6 of the relay RCS now open.

The lower rail code 1-2-4-5-6 is now recorded by the punch unit by reason of the energization of the front panel relay RFP through the normally closed contacts 3 and 4 of the relay RIO and through the diode rectifier devices CR25, CR29, CR36 and CR42, the punch magnets LP1, LP2, LP4, LP5, LP6 and the punch clutch magnet LPC being energized through closed contacts of the relay RFP and various diode rectifiers as shown. If the relay RIO is now assumed to be energized at the time the switch S8 is manually actuated, the contacts 3-5 of the relay RIO transfer to energize the front panel relay RFP and the punch clutch magnet LPC only, thereby merely to punch a feed hole in the tape passing through the punch unit. This recording of a tape feed hole only is used to provide a short time delay often-times required for the operation of the line casting machine.

Manual actuation of the switch S9 causes the punch unit to record either a stop code 2-4-5-6 or a quad right code 2-3-4-5-6 depending upon whether the relay RIO is respectively deenergized or energized at the time the switch S9 is manually operated. A stop code recorded in the tape is useful in automatically halting operation of a typewriter when automatically operated from the tape presently in preparation. A stop code when read by the tape reader of a page printer usually will ring a warning bell. A quad right code operates the automatic quadder of a line casting machine to align the last character of a line with the right hand margin of the column of type. Assuming for the moment that the relay RIO is deenergized, manual operation of the switch S9 effects energization of the front panel relay RFP through diode rectifiers CR30, CR41 and CR42, and effects energization of the punch magnets LP2, LP4, LP5, and LP6 and the punch clutch magnet LPC through now closed contacts of the relay RFP and various diode rectifiers as shown. If the relay RIO is energized when the switch S9 is manually actuated, the now closed contacts 9 and 10 of the relay RIO effect additional energization of the punch magnet LP3 through a diode rectifier CR33 to effect recording of a quad right code 2-3-4-5-6.

Manual actuation of a switch S10 causes the punch unit to record a vertical rule code 1-4-6 or a paper feed code 4-6 depending upon whether the relay RIO is respectively deenergized or energized at the time of manual actuation of the switch S10. A vertical rule code causes the line casting machine to use an em space (18 units wide), and performs the same function as a code recorded by operation of the em space key lever of the typewriter except that in the line casting machine the physical spacing material (matrix) comes from a different channel in the magazine. A paper feed code advances the paper in a page printer by one line; it is ordinarily used in special applications involving news gathering agencies. Assuming for the moment that the relay RIO is deenergized when the switch S10 is manually actuated, the front panel relay RFP is energized through the diode rectifiers CR35, CR36 and CR42, and the punch magnets LP1, LP4, LP6 and punch clutch magnet LPC are energized through now closed contacts of the relay RFP and through various diode rectifiers as shown, thus to record a vertical rule code 1-4-6. When the relay RIO is energized at the time of manual actuation of the switch S10, the now open contacts 21 and 22 of the relay RIO prevent energization of the punch magnet LP1 so that a paper feed code 4-6 recorded.

Operation of the switch S10 to record a vertical rule code 1-4-6 as last described also causes the typewriter carriage to move an 18 unit space to the left. To this end, the switch S10 applies energization through the normally closed contacts 21 and 22 of the relay RIO and the normally closed contacts 21 and 22 of a relay RCE to energize a relay RFD (FIG. 10a). The latter maintains itself energized through the normally closed contacts 21 and 22 of the relay RCE and its now closed contacts 1 and 2. A translator magnet LT7 (FIG. 10h) is now energized through a diode rectifier CR50 from the hold energizing circuit last traced for the relay RFD. A translator clutch magnet LTC (FIG. 10d) is also now energized through a diode rectifier CR90, now closed contacts 5 and 6 of the relay RFD, a diode rectifier CR73, normally closed contacts 3 and 4 of the relay RRPC, and the now closed contacts 1 and 2 of the punch ON switch S2. Energization of the translator clutch magnet LTC operates the translator structure through a cycle of operation, and at 15° of this cycle the translator cam actuated contacts STC-4 (FIG. 10f) close to apply energization through the now closed contacts 3 and 4 of the relay RFD to a relay RCE (FIG. 10a). The contacts 21 and 22 of the relay RCE thereupon open to deenergize the relay RFD, the relay RCE remaining energized through its now closed contacts 22 and 23 until the contacts 1 and 2 of the relay RFD open and being itself deenergized when the translator contacts STC-4 open at 355° of the translator cycle. Energization of the translator magnet LT7 actuates a dummy key lever of the typewriter. This key lever causes the code selector contacts SS11 (FIG. 10f, these contacts being operated by the dummy key lever) to close in series with contacts SS7 which are closed by operation of all key levers. Energization is thus applied through the now closed contacts SS7 and SS11 and through diode rectifiers CR20, CR1 and CR2 to the escapement magnets LE3 and LE4 and through diode rectifiers CR19, CR9 and CR10 to the escapement magents LE5 and LE6 to produce a carriage escapement of 18 units.

The punch unit is prepared for operation by inserting an unperforated paper tape into recording position and by then feeding out a short length of this tape by operation of a tape feed switch S1A (FIG. 10d) which directly energizes the punch clutch magnet LPC to effect punching of a succession of feed holes so long as the tape feed switch S1A is maintained manually depressed.

With the key lever lock magnet LKL energized in the manner previously explained, the key levers of the typewriter are unlocked and may be manually operated to type alpha-numeric characters and symbols. As each such character or symbol is thus typed, code selector contacts SS1–SS6 (FIGS. 10f and 10g) are operated in coded combinations. These energize the punch magnets LP1–LP6 through diode rectifier devices CR62–CR67 to record a corresponding code by the punch unit, the selector contacts SS1–SS6 and punch clutch magnet LPC being energized at this time directly and through the diode rectifier CR68 from an energizing circuit which includes the normally closed contacts 1 and 2 of the relay RPE, the normally closed contacts 23 and 24 of a relay RAR, the normally closed contacts 3 and 4 of the punch latch contact assembly SPL, and the selector common contacts SSC which close with each key lever actuation.

As each alpha-numeric character and symbol is thus typed, a system of selector bridge contacts SSB–1 to SSN–43 shown in FIGS. 10i–10k are operated to closed contact position according to the particular alpha-numeric character or saymbol typed (as indicated by the characters and symbols shown in association with these bridge contacts). It will be noted that the bridge contacts are arranged in concurrently operated pairs, of which the movable contact of one pair is energized when the type basket of the typewriter is in its lower case position whereas the movable contact of the other pair is energized when the type basket is in its upper case position. For example, the bridge contacts SSB–4 operated by the "Z" key lever of the typewriter include a pair of contacts 1 and 2 and a pair of contacts 3 and 4; the contact 3 is energized through the normally closed contacts 11 and 12 of the basket shift actuated contacts SCS (FIG. 10f), when the type basket is in its lower case position, and through the selector contacts SS7 which are closed by operation of all key levers, whereas the contact 1 of the bridge contacts SSB–4 is energized by closure of the contacts 12 and 13 of the basket shift contacts SCS when the type basket is moved to its upper case position. The bridge contacts SSB–1 to SSB–43 here considered energize the escapement magnets LE3–LE6 directly or through the diode rectifiers CR1–CR20 as shown in FIG. 10e to cause the carriage escapement to be controlled by unit values of 6 through 15 and 18 units according to the width of the alpha-numeric character or symbol typed. The particular units of escapement effected upon typing each alpha-numeric character of symbol are indicated in FIG. 10i in association with the line conductors identified as L1–L11.

In addition to the alpha-numeric character and symbol escapement bridge contacts SSB–1 to SSB–43 just discussed, there are several special bridge contacts and contact assemblies which merit consideration at this time. These are the bridge contacts SSB–S which are operated by the EM LD–SP key lever, the bridge contacts SSB–W which are operated by the EN LD–SP key lever, and the bridge contacts SSB–U which are operated by the thin space key lever.

Upon manual operation of the EM LD–SP key lever, an em space code 3–5–6 is recorded when the type basket is in its lower case position and an em leader code 1–3–6 is recorded when the type basket is in its upper case position. The EM LD–SP bridge contacts SSB–S cooperate with the basket shift contacts SCS (which are shown in their lower case position but which transfer upon shift of the type basket to its upper case position) to energize the punch magnet LP5 and record the 5 code bit of the em space code 3–5–6 when the type basket is in its lower case position or alternatively to energize the punch magnet LP1 and record the 1-code bit of the em leader code 1–3–6 when the type basket is in its upper case position. To this end, the contact No. 1 of the bridge contacts SSB–S is energized through the selector common contacts SSC (FIG. 10a) upon each key lever actuation. Upon closure of the contacts 1 and 2 of the bridge contacts SSB–S, this energization is applied through a diode rectifier CR101 to the transfer contact 5 of the basket shift contacts SCS. In the lower case position of the latter contacts, its contacts 4 and 5 are closed so that the energization applied through the diode rectifier CR101 is applied directly to the punch magnet LP5 to effect recording of a 5-bit code. In the upper case position of the basket shift contacts SCS, its contacts 5 and 6 are closed and the energization applied through the diode rectifier CR1 is applied directly to the punch magnet LP1 to effect recording to a 1 code bit. The operation of the EM LD–SP key lever also causes the selector contacts SS11 (FIG. 10f) to close, and energization is applied through the selector contacts SS7 (which close upon each key lever actuation), the selector contacts SS11, diode rectifiers CR19 and CR20, and diode rectifiers CR9 and CR10 to all of the escapement electromagnets LE3, LE4, LE5, and LE6 to effect an 18-unit space of the typewriter carriage.

When the EN LD–SP key lever is manually operated, the contacts 4 and 5 of the bridge contact assembly SSB–W close to apply energization from the selector contacts SS7 (FIG. 10f, these contacts closing upon each key lever operation) through line conductor L4 of FIG. 10i and diode rectifiers CR5 and CR6 to energize the escapement magnets LE4 and LE5 and thus effect a 9-unit escapement space of the typewriter carriage. At the same time, the now closed contacts 6 and 7 of the bridge contact assembly SSB–W apply energization from the selector common contact SSC (FIG. 10a, which contacts close upon each key lever operation) through a diode rectifier CR100 to the movable contact 2 of the basket shift contacts SCS. With the latter contacts in their lower case position to close their contacts 1 and 2, the energization supplied through the diode rectifier CR100 directly energizes the punch magnet LP2 to record the two code bit of the en space code 2–3–4–6; alternatively when the basket shift contacts SCS transfer upon movement of the type basket to the upper case position, the energization supplied through the diode rectifier CR100 is now supplied through the contacts 2 and 3 of the basket shift contacts SCS through a diode CR60 to the punch magnet LP5 and through a diode rectifier CR61 to the punch magnet LP1 to record the 1 and 5 code bits of the en leader code 1–3–4–5–6.

When the thin space key lever is operated, the thin space bridge contacts SSB–U are concurrently operated. This key lever operation records a thin word space code 6 and concurrently causes the typewriter carriage to move by a word space much in the same manner as though the word space bar of the typewriter had been manually operated but with one possible difference. The word space effected by operation of the word space bar has a preselected unit value which, as previously explained, is dependent upon the manual setting of the minimum word space selector switch SMS. The latter is shown in FIG. 10e and is identified as minimum word space selector switch SMS–1 having two decks A and B. When the thin space key lever is operated and effects concurrent closure of the contacts 4 and 5 of the thin space bridge contacts SSB–U, energization is applied from the selector contacts SS7 (which close upon each key lever operation) through the contacts 4 and 5 of the bridge contact assembly SSB–U to the rotary contact of the B deck of the minimum word space selector switch SMS–1. For manual setting of this switch to any of its positions 1–3 or 5–7, the energization applied to the rotary contact of the switch is supplied through the stationary switch contacts conneced in common as shown directly to energize the escapement magnet LE6 and thus effect a 6-unit escapement of the typewriter carriage. If the minimum word space selector switch SMS–1 is set to its fourth position, the energization of the B deck rotary contact is applied to the movable contact No. 2 of a selector contact SSB–T. This selector contact normally is positioned as shown to close its contacts 1 and 2 so that the energization applied to the contact No. 2 is supplied through the line conductor L1 of FIG. 10i to energize the escapement magnet LE6 and thus effect a 6-unit escapement of the typewriter carriage. However, should the space bar be operated concurrently with operation of the thin space key lever, the selector contacts SSB–T transfer with operation of the space bar and the energization of the minimum word space selector switch deck B is now applied through the contacts 2 and 3 of the selector contacts SSB–T to energize line conductor L7 of FIG. 10i and thereby effect a 12-unit escapement of the typewriter carriage by energization of the escapement magnets LE3, LE4, and LE5 through diode rectifiers CR5, CR6, CR11 and CR15.

Operation of the space bar of the typewriter effects normal word space escapement of the typewriter carriage but by a unit value depending upon the preselected manual setting of the minimum word space selector switch SMS–1. It has just been explained that operation of the space bar causes concurrent operation of the selector contacts SSB–T of FIG. 10f. Thus each space bar operation effects closure of the contacts 4 and 5 of the selector contacts SSB–T, and energization is applied from the selector contacts SS7 (which close upon operation of the space bar and each key lever) through the now closed contacts 4 and 5 of the selector contacts SSB–T to the movable contact of deck A of the minimum word space selector switch SMS–1. This energization of deck A of the switch SMS–1 produces word space values of 3 units, 4, units, 5 units, 7 units, 8 units or 9 units (depending upon the manual setting of the minimum word space selector switch in its respective positions 7, 6, 5, 3, 2 or 1) by energization of the escapement magnets LE3–LE6 singly or in various combinations and either directly or through diode rectifiers as shown. When the minimum word space selector switch is manually set to its position No. 4, the energization applied to its deck A is translated through the normally closed contacts 1 and 2 of the thin space bridge contacts SSB–U (assuming there is no concurrent operation of the thin space key lever) to the line conductor L1 of FIG. 10i to energize the escapement magnet LE6 and thus effect a 6-unit escapement space of the typewriter carriage. The concurrent operation of the space bar and thin space key lever in accomplishing a 12-unit word space of the typewriter carriage was previously described.

Each operation of the space bar also effects closure of the selector contacts SS10 of FIG. 10k. This energization is applied to the movable contact of deck B of a double decked rotary stepping switch SSCS shown in FIG. 10k. The energization thus applied to the switch deck B is further applied through the commonly connected stationary contacts of this switch deck to energize a stepping magnet L–SSCS and thereby advance a stepping pawl to the next tooth of a ratchet wheel mechanically connected to both movable contacts of the stepping switch. When the selector contacts SS10 open at the end of the word space operation, the stepping switch magnet L–SSCS becomes deenergized and the pawl under spring bias advances the movable contacts of both the A and B switch decks by one step. This stepping switch thus operates to count the number of word spaces in each line of copy.

As a line of copy is typed and the typewriter carriage moves toward the right hand margin, the stepped cam plate 53 (FIG. 4) carried by the carriage as earlier described reaches the justification zone and effects closure of the stepping zone justification contacts LLS–1–LLS–10 in succession and in order from the contacts LLS–10 to the contacts LLS–1. The movable contact blades of these justification zone contacts are energized in common through the end-of-zone contacts SEZ, which are normally closed and only open after the carriage has moved beyond the justification zone as previously described in connection with FIG. 2a. As the line of copy is typed and the number of word spaces is counted by the stepping switch SSCS as just described, the stepped cam plate 53 of the carriage will eventually close that one of the justification zone contacts LLS–1–LLS–10 which is electrically connected to a stationary contact of the stepping switch A deck upon which the movable contact of this deck rests at this time.

Energization is thereupon applied through this justification zone contact and the A deck contacts of the stepping switch to illuminate a zone light L and thereby provide a visual indication to the operator that the justification zone has been reached. The illumination of the justification lamp L indicates that the line of copy is long enough to justify when cast by the line casting machine. A glance at the scale 31 (FIG. 3a) of the typewriter carriage will then indicate whether or not another word or syllable can be added. If in completing the line of copy one or more word spaces are used, these additional word spaces are counted by corresponding stepped advances of the stepping switch SSCS but the associated one of the justification zone contacts LLS–1–LLS–10 has already been closed and the justification zone light L thus remains illuminated. If in completing the line of copy the carriage goes beyond the zero position on the scale 31, opening of the end-of-zone contacts SEZ will extinguish the justification zone light L to indicate an excessive length of line which cannot be justified by the line casting machine. The punched-tape recording being prepared at the time may be immediately corrected by manually backing it up to the last recorded word space, by manually operating the code delete switch S6 to delete the word space code and all codes recorded thereafter, and by then manually operating the carriage return key of the typewriter (on the typed copy, the characters deleted in the tape are then typed as the first characters of the new line of copy).

Now when the carriage return key lever is operated, the carriage return contacts SCR (FIG. 10d) open to de-energize the key lock magnet LKL and lock up the key levers against further operation until the carriage return operation is completed. At the same time, the selector contacts SS2 (FIG. 10f) energize the punch magnet LP2 by energization received through the selector common contacts SSC (FIG. 10a) and the punch clutch magnet LPC is energized to record a 2 carriage return code.

The carriage return operation transfers the selector contact assembly SSB–V (FIG. 10f), and the contacts 2 and 3 of the latter thereupon close to energize a delay control relay RDC through a diode rectifier CR55. The now closed contacts 12 and 13 of the relay RDC apply the energization of the carriage return selector contacts SSB–V to energize a home switch relay RHS which thereafter remains energized through its now closed contacts 24 and 25 and through the now closed contacts of the relay RDC. The relay RHS contacts 1 and 2 (FIG. 10d) open to de-energize the key lock magnet LKL to lock up the typewriter key levers. The translator clutch magnet LTC (FIG. 10d) is concurrently energized through the now closed contacts 4 and 5 of the carriage return selector contact assembly SSB–V, a diode rectifier CR72, the normally closed contacts 3 and 4 of the relay RRPC, and the now closed contacts 1 and 2 of the punch ON switch S2. The translator thereupon initiates a cycle of operation, and the translator cam actuated contacts STC–3 (FIG. 10f) apply energization from 180° to 290° of the translator cycle through the now closed contacts 23 and 24 of the relay RDC to the movable contact 5 of an off normal contact assembly S20 shown in FIG. 10g. The off normal contacts S20 are operated by the stepping switch SSCS, and are shown in the position which they occupy when the stepping switch is in its home position where the movable contact of the stepping switch deck B engages the stationary contact identified as "N." As soon, however, as the stepping switch has been operated through at least one step in counting a word space, the off normal contact assembly S20 transfers to close its contacts 4 and 5 and its contacts 1 and 2.

Assuming that the stepping switch SSCS has counted at least one word space at the time of operation of the carriage return key lever, the energization applied to the movable contact 5 of the off normal contact assembly S20 as last described effects energization of the relay RFP (FIG. 10b) and this same energization is thereupon applied through the now closed contacts 29 and 30 of the relay RFP to effect energization of the punch clutch magnet LPC. The energization of the translator cam actuated contacts STC–3 is also applied through the now closed contacts 21 and 22 of the relay RDC and the now closed contacts 23 and 24 of the relay RFP to energize the punch magnet LP4 so that the punch unit records a 4 elevate code as the next succeeding code following the recording of the carriage return code. The elevate code is required by the line casting machine to effect automatic elevation of the line of type matrices which the machine has been assembling under control of its tape reader and the transfer of the line of matrices to casting position in the machine.

Assume now that no word spaces have been counted by the stepping switch SSCS at the time of the carriage return operation so that the off normal contact assembly S20 stands in non-transfer position. The relay RDC is energized as before and the translator cycle initiated in the same manner as just described causes the translator cam actuated contacts STC–3 to apply energization through the now closed contacts 23 and 24 of the relay RDC, the now closed contacts 5 and 6 of the off normal contact assembly S20, and diode rectifier CR42 to energize the front panel relay RFP which thereupon closes its contacts 27 and 28 to apply this energization to the punch magnet LPC. Energization is also applied by the translator cam actuated contacts STC–3 through the now closed contacts 21 and 22 of the relay RDC and the now closed contacts 23 and 24 of the relay RFP to energize the punch magnet LP4. The energization applied through the diode rectifier CR42 to energize the relay RFP as just described is also applied through the now closed contacts 29 and 30 of the latter relay to energize the punch clutch magnet LPC so that the punch unit records a paper feed code 4–6. This code is recorded only for the benefit of certain printing equipments similar to that of a line casting machine.

The recording of the carriage return code in the manner just described must be followed by the automatic recording of an elevate code 4 (and not by a paper feed code 4–6) whenever the operator has operated any of the quad code recording switches S6, S7 or S9 at the time the relay RIO is energized. To this end, the energization applied to the punch magnet LP3 by operation of any of the last mentioned switches is further applied through a diode rectifier CR34, the now closed contacts 25 and 26 of the relay RIO, the normally closed contacts 2 and 3 of the off normal contact assembly S20, the normally closed contacts 3 and 4 of the relay RDC, and the normally closed contacts 1 and 2 of the interrupter switch S21 to the selector switch stepping magnet LSSCS to effect a one step advance of the stepping switch. Thus any quad code recorded, which signifies the creation of at least a portion of a line of alphanumeric characters or symbols, insures that a carriage return code is immediately followed by an elevate code so that the partial line assembly of matrices of the line casting machine is elevated and transferred automatically to casting position in the machine.

The delay relay RDC, upon becoming energized during a carriage return operation in the manner just described, remains energized through the selector common contacts SS7 and the diode rectifier CR69 (and also remains energized to 355° of the translator cycle by energization supplied through the translator cam actuated contacts STC–4) and the now closed contacts 1 and 2 AX of the relay RDC. The delay relay RDC provides a sufficient delay to ascertain, during the carriage return operation and recording of the carriage return code, whether the off normal contact assembly S20 has or has not transferred and thus determine whether the carriage return code recording is to be followed by recording of an elevate 4 code or paper feed 4–6 code in the manner just explained. The home switch relay RHS likewise is maintained energized by its now closed contacts 24 and 25 and the now closed contacts 25 and 26 of the relay RDC. Following completion of the translator cycle of operation, during which the carriage return code and either an elevate code or a line feed code is recorded, the translator contacts STC–4 open to deenergize the relay RDC. If the stepping switch SSCS (FIG. 10k) has stepped off its home position to transfer the contacts of the off normal contact assembly S20, the home switch relay RHS now remains energized through its now closed contacts 22–25 and the now closed contacts 1 and 2 of the contact assembly S20. The stepping switch magnet LSSCS is now intermittently energized through the stepping switch interrupter contacts S21 (which open and close upon each stepping operation of the stepping switch), the now closed contacts 3 and 4 of the relay RDC, the now closed contacts 1 and 2 of the transferred off normal contact assembly S20 and the now closed contacts 22 and 23 of the home switch relay RHS. When the stepping switch SSCS has thus been stepped through its 10th stepping position and reaches its home position (corresponding to the stationary contact N of the stepping switch B deck), the off normal contact assembly S20 returns to its normal position at which its contacts 1 and 2 are open and thus interrupt the energizing circuit of the stepping switch magnet LSSCS. This deenergizes the relay RHS and halts the stepping switch at its home position in readiness to perform a further word space counting operation.

If two key levers are successively manually operated at a typing speed exceeding the rate of possible punch operation, a code punching error may result. To guard against this character of punch error, an anti-repeat relay RAR (FIG. 10a) and a punch error relay RPE are energized in the event of an excessively high typing rate. Shortly after the tape punch unit initiates a cycle of operation, the punch latch transfer contact assembly SPL (FIG. 10a) is operated to close the latch contacts 3 and 5. This occurs while contacts 1 and 2 of the selector common contacts SSC are yet closed, and an anti-repeat relay RAR is thereupon energized through a circuit which includes normally closed contacts 1 and 2 of a read control relay RRC, the contacts 3 and 5 of the punch latch contact assembly SPL, the contacts 1 and 2 of the selector common contacts SSC, normally closed contacts 3 and 4 of the relay RCE, normally closed contacts of all of the panel switches S6–S10, the diode rectifier CR75, normally closed contacts 3 and 4 of the relay RRPC, and the now closed contacts 1 and 2 of the punch ON switch S2. When the contacts 3 and 5 of the punch latch contact assembly SPL open near the end of the punch cycle, the anti-repeat relay RAR remains energized through its now closed contacts 27 and 28, normally closed contacts 21 and 22 of the punch error relay RPE, and the contacts 1 and 2 of the selector common contacts SSC if these contacts have been closed again by an excessively rapid manual operation of a succeeding key lever. If the contacts 1 and 2 of the selector common contacts SSC remain closed upon reclosing of the contacts 3 and 4 of the punch latch contact assembly SPL, the punch error relay RPE is energized through the now closed contacts 25 and 26 of the relay RAR, the now closed contacts 3 and 4 of the punch latch contact assembly SPL, and the contacts 1 and 2 of the selector common contacts SSC.

The punch error relay RPE is maintained energized through two possible energization hold circuits: (1) the now closed contacts 1 and 2 of the punch ON switch S2, the normally closed contacts 3 and 4 of the relay RRPC, closed contacts 29 and 30 of the relay RIO if this relay stands energized at this time, and the now closed contacts 25 and 26 and contacts 27 and 28 of the relay RPE; and (2) now closed contacts 1 and 2 of the punch ON switch S2, normally closed contacts 3 and 4 of the relay RRPC, normally closed contacts of the code delet-quad center panel switch S6, and now closed contacts 27 and 28 of the relay RPE. The anti-repeat relay RAR becomes deenergized by interruption of its hold energizing circuit at the now open contacts 21 and 22 of the punch error relay RPE. The now open contacts 1 and 2 of the punch error relay RPE interrupt the normal energizing circuit of the punch energizing code selector contacts SS1–SS6 (FIGS. 10f and 10g) and the energizing circuit through the diode rectifier CR68 for the punch clutch magnet LPC. The now open contacts 5 and 6 of the punch error relay RPE interrupt the energizing circuit for the front panel relay RFP so that the punch unit may not be energized by any of the panel switches S6–S10 so long as the punch error relay RPE remains energized.

The punch error relay RPE is deenergized by a code delete manual operation of the panel switch S6 to interrupt one hold energizing circuit of the punch error relay and at the same time operate the punch unit to record a delete code 1–2–3–4–5–6 (the punched tape being manually turned back one step to delete the last recorded code). Since the code delete operation requires that the relay RIO be deenergized to permit the panel switch S6 to record a delete code rather than a quad center code, the other hold energizing circuit of the punch error relay includes the normally open contacts 29 and 30 of the relay RIO and these contacts thus insure continuance of energization of the punch error relay RPE so long as the relay RIO remains energized. Therefore, the panel switch S5 should be manually operated to deenergize the relay RIO if this relay should be energized at the time the punch error relay RPE becomes energized, and subsequent energization of the panel switch S6 interrupts the other hold energizing circuit of the punch error relay RPE so that the front panel relay RFP may now become energized and effect the recording by the punch unit of a delete code. It may be noted in this respect that so long as the punch error relay RPE remains energized, the key lock magnet LKL (FIG. 10d) is deenergized by the now open contacts 23 and 24 of the relay RPE to maintain the key levers of the typewriter locked against operation.

The punch error relay RPE may also be directly energized upon closure of the contacts of a punch tape contact assembly SPT (FIG. 10a) as would occur upon exhaustion of a supply of unpunched tape in the tape punch unit or should some malfunction of the tape supply reel cause the tape to become excessively tight as it is pulled into the tape punch unit. This energizing circuit of the punch error relay RPE includes only the punch tape contacts SPT and the now closed contacts 1 and 2 of the punch ON switch S2. The hold energizing circuits of the punch error relay RPE are, however, those just described so that the same corrective action is required to restore the system to operative condition by deenergization of the punch error relay RPE.

The typewriter includes, as previously mentioned, a tape reader unit having reader code aperture sensing pins and associated reader contact assemblies SR1–SR6 and reader clutch magnet LRC shown in FIGS. 10d and 10h. The reading of a previously prepared tape by the tape reader enables entirely automatic operation of the typewriter for purposes either of operating the tape punch unit to duplicate the tape while producing a typed copy of the information recorded by the tape or for purposes of producing a new tape similar to that read by the tape reader but revised and corrected for errors appearing in the read tape.

The system is placed into automatic operation, under control of a tape read by the tape reader, by manual operation of a start read switch S3 (FIG. 10d) to energize a read control relay RRC. This energizing circuit includes normally closed contacts of a stop read switch S4, now closed contacts 1 and 2 of the start read switch S3, now closed contacts 1 and 2 associated with the key lock magnet LKL energizing at this time through the normally closed contacts 1 and 2 of the relay RHS, normally closed contacts 1 and 2 of the carriage return contacts SCR, normally closed contacts 3 and 4 of the punch error relay RPE, and normally closed contacts 1 and 2 of the reader tape contact assembly SRT (these contacts being closed when a tape is properly positioned in the tape reader in readiness to be read). The relay RRC remains energized, from the energizing circuit last traced, through its now closed contacts 9 and 10 and the stop read switch S4.

Upon manual release of the start read switch S3 to close its contacts 2 and 3, a relay RRPC (FIG. 10c) is energized by a continuation of the energizing circuit last traced and which now includes the normally closed contacts 2 and 3 of the start read switch S3, the now closed contacts 28 and 29 of the read control relay RRC, the now closed contacts 3 and 4 of the punch ON switch S2, and a diode rectifier CR71. The relay RRPC is normally maintained energized through the energizing circuit just traced. However, it may also remain energized: (1) during a cycle of reader operation through an energizing circuit which includes the then closed contacts 1 and 2 of the reader common contact assembly SRC and the now closed contacts 1 and 2 of the punch ON switch S2; or (2) during a translator cycle of operation through an energizing circuit which includes the now closed contacts 1 and 2 AX, of the relay RRPC, a diode rectifier CR43, and either the closed contacts of the translator cam actuated contacts STC4 or through a diode rectifier CR69 and the closure of selector common contacts SS7 which are operated as previously explained by each operation of a key lever of the typewriter. The relay RRPC contacts 3 and 4 (FIG. 10a) now open to remove energization from the manually operable panel switches S5–S10, so that these switches become inactive, and to deenergize the relay RFPC.

Operation of the tape reader may be halted by manual operation of the stop read switch S3 to deenergize the read control relay RRC, which thereupon opens its contacts 28 and 29 to interrupt the normal energizing circuit of the relay RRPC and thereby deenergize this relay at the completion of a reader or translator cycle of operation.

Upon manual operation and release of the start read switch S3 to energize the relays RRC and RRPC as just explained, the reader clutch magnet LRC (FIG. 10d) is energized through normally closed contacts 24 and 25 of the relay RCE, normally closed contacts 21 and 22 of the relay RFD, now closed contacts 28 and 29 of the relay RRC, now closed contacts 2 and 3 of the start read switch S3 and now closed contacts 1 and 2 associated with the key lock magnet LKL from the energizing circuit of the latter. The tape reader thereupon operates through a succession of reading cycles during each of which the contacts 3 and 4 of the reader common contact assembly SRC energizes the translator clutch magnet LTC through normally closed contacts 2 and 3 of any one of the reader contact assemblies SR1–SR6 and a diode rectifier CR90. The contacts 1 and 2 of the reader contact assemblies SR1–SR6 energize individual ones of the translator magnets LT1–LT6 which control the translator to effect automatic operation of an alpha-numeric character or symbol or function of the typewriter according to each read code, and thus effect automatic typed reproduction of the information read from the tape passing through the reader.

The punch magnets LP1–LP6 are also energized through the now closed contacts 6–9 and 21–28 of the relay RRPC concurrently with energization of a corresponding individual one of the translator magnets LT1–LT6, the punch clutch magnet LPC being energized through the now closed contacts 29 and 30 of the relay RRPC concurrently with energization of the translator clutch magnet LTC. Thus each typed alpha-numeric character or symbol is concurrently punch-code recorded by operation of the tape punch unit.

A delete code 1–2–3–4–5–6 read by the tape reader is ignored. This code causes all of the reader contact assemblies SR1–SR6 to transfer so that no energization can be supplied from the reader common contact assembly SRC to the translator clutch magnet LTC or translator magnets LT1–LT7 or to the punch clutch magnet LPC or punch magnets LP1–LP6.

Those electrically interconnected contacts shown in FIG. 10h and which constitute additional contacts of the reader contact assemblies SR1–SR6 control automatic operations from information codes read from the tape passing through the reader. These automatic operations are similar to those performed by the panel switches S3 and S5–S10 shown in FIGS. 10b and 10c and will now be briefly considered.

The reading of a stop code 2–4–5–6 will be recorded by the punch unit in normal manner and will apply reverse energization to the read control relay RRC through the now closed contacts 26 and 27 of the latter and thus halt the automatic operations by deenergizing this relay which in turn effects deenergization of the relay RRPC as previously explained.

The reading of a lower rail code 1–2–4–5–6 will be recorded by the punch unit and will apply reverse energization to the upper rail relay RULR (FIG. 10c) through the normally closed contacts 21 and 22 of the color shift relay RCS, or through the then closed contacts 22 and 23 of the latter relay and the then closed contacts 3 and 4 of the relay RULR, thereby to deenergize this relay and with it the color shift relay RCS in the manner previously explained. The reading of an upper rail code 1–2–5–6 will effect the recording of this code by the punch unit in the manner above described, and will also effect energization of the upper rail relay RULR through the normally closed contacts 24 and 25 of the color shift relay RCS and subsequent energization of the color shift relay RCS through the then closed contacts 22 and 23 of the relay RULR.

The reading of a vertical rule code 1–4–6 will effect a corresponding recording by the tape punch unit and the energization of the relays RFD and RCE in the manner and for the purpose previously described.

The reading of a thin space code 6 or an add thin space code 3–6 will effect recording of a corresponding code by the tape punch unit and concurrent energization of the translator magnet LT7 to effect operation of the thin space key lever or concurrent operation of this key lever and the word space bar of the typewriter.

A carriage return code read from the tape passing through the tape reader will ordinarily be followed by an elevate four code or a paper feed code 4–6. The carriage return code when read will be recorded by tape punch unit by reason of the energization of the punch magnet LP2 and punch clutch magnet LPC under control of the reader electrical contact assembly SR2 and reader common contact SRC. The translator magnet LT2 and control clutch magnet LTC will concurrently be energized and cause the translator seeker mechanically to operate the carriage return key lever. This seeker also causes the contacts of a contact assembly STM (FIG. 10g) to close and energize the delay control relay RDC. This relay maintains itself energized through its contacts 1 and 2 AX and the now closed cam actuated translator contacts STC–4.

The relay RRPC is now maintained energized through its now closed contacts 1 and 2 AX, the diode rectifier CR43, and the translator cam actuated contacts STC–4 to 355° of the translator cycle and is thereafter maintained energized through the now closed contacts 1 and 2 AX and 8 and 9 of the delay control relay RDC and the normally closed contacts 21 and 22 of the relay RHS. At the outset of the carriage return operation, and by reason of the previously described operation of the carriage return key lever, the carriage return bridge contact assembly SSB–V is operated to apply energization through the diode rectifier CR55 to the delay control relay RDC and to energize the home switch relay RHS through the now closed contacts 12 and 13 of the delay relay RDC. The relay RHS is maintained energized through its now closed contacts 24 and 25 and the now closed contacts 25 and 26 of the relay RDC. If the stepping switch SSCS (FIG. 10k) is not at its home position so that the off normal contact assembly S20 of FIG. 10g has transferred to close its normally open contacts 1 and 2, a hold energizing circuit for the home switch relay RHS is also completed through its contacts 24 and 25, the now closed contacts 1 and 2 of the off normal contact assembly and the now closed contacts 22 and 23 of the relay RHS.

The contacts 1 and 2 of the relay RHS now open to deenergize the key lock magnet LKL to lock the key levers of the typewriter against operation, to deenergize the reader clutch magnet LRC and halt the tape reader operation, and to interrupt the direct energizing circuit through the diode rectifier CR71 to the relay RRPC. At the time the reader clutch magnet LRC is deenergized as last explained, the reader has initiated a further cycle of reading operation to read the elevate code 4 or paper feed code 4–6 which follows the carriage return code in the tape passing through the reader. The translator clutch magnet LTC has also been energized to initiate a translator cycle of operation so that the relay RRPC is maintained energized through its hold contacts 1 and 2 AX, the diode rectifier CR43, and the translator cam actuated contacts STC–4. The relay RRPC contacts 23 and 24, 27 and 28 and 29 and 30 remain closed so that the elevate or paper feed code is recorded by the punch unit under control of the reader contacts SR4 or SR4 and SR6 and the reader common contacts SRC. This code is read and recorded by the punch unit while the carriage return operation of the typewriter is in progress. The reader halts after this reading cycle of operation.

The relay RRPC and the delay control relay RDC remain energized until the translator cam actuated contacts STC–4 open at 355° of the translator cycle. If the word space counting stepping switch SSCS (FIG. 10k) has not yet been stepped off of its home position so that the off normal contact assembly S20 of FIG. 10g remains with its contacts 1 and 2 open, the opening of the contacts 25 and 26 of the relay RDC interrupts the hold energizing circuit of the relay RHS and the latter thereupon becomes deenergized. If on the other hand, the stepping switch SSCS has stepped off of its home position so that the off normal contact assembly S20 has transferred to close its contacts 1 and 2, the relay RHS remains energized through its now closed contacts 24 and 25, the now closed contacts 1 and 2 of the off normal contact assembly S20 and the now closed contacts 22 and 23 of the relay RHS. This causes the stepping switch stepping magnet LSSCS to be energized through the stepping switch interrupter contacts S21 and the now closed contacts 3 and 4 of the relay RDC from the energizing circuit last traced. The stepping switch thereupon is automatically stepped to its home position at which time the off normal contact assembly S20 transfers to open its contacts 1 and 2 and thus deenergize the stepping switch magnet LSSCS and the relay RHS.

Upon deenergization of the relay RHS, its contacts 1 and 2 again close to energize the key lock magnet LKL and unlock the key levers of the typewriter for operation and concurrently to energize the reader clutch magnet LRC so that the tape reader resumes its reading operation to effect further automatic operations of the typewriter and tape punch unit.

It will be apparent from the foregoing description of the invention that the justification-zone indicating counter of the invention may be readily incorporated in a punched-tape perforator or into an electric typewriter having associated punched-tape reader and tape punch units and using an essentially standard office typewriter keyboard, and enables the creation of punched tape with correct justification for control of line casting machines using a wide range of type sizes and styles and which may use a large variety of spaceband models and makes. Incorporation of the justification-zone indicating counter of the invention into an electric typewriter has the particular advantage that typed copy is produced concurrently with production of the punched tape. This is true regardless of whether the typewriter operation is automatically controlled by a punched tape read by a tape reader or by manual operation of the typewriter which, importantly, may be accomplished by office typists needing a minimum of additional training or skill for this purpose. Incorporation of the justification-zone indicating counter of the invention into an electric typewriter has the further important advantage that it enables a line casting machine control tape to be quickly and accurately duplicated automatically by use of another such punched tape read by an associated punched-tape reader or, by reference to concurrently typed copy automatically reproducing the information and line format of such other tape, to be reproduced with immediate correction of any errors noted or with revisions not appearing in the other tape.

While a specific form of the invention has been described for purposes of illustration, it is contemplated that possible changes may be made without departing from the spirit of the invention.

We claim:

1. A justification-zone indicating counter comprising first word-space-selection means for preselecting an individual one of any of plural available minimum-word-space unit values, accumulator means movable in discrete unit-valued steps to accumulate the total length of a line of alpha-numeric characters and symbols each having an individual preselected unit-value width and including word spaces having said preselected individual word-space unit value, means for counting the number of word spaces in each said line, electrical-contact actuating means movable with said accumulator means for preselecting any of plural maximum-justification-expansion word-space unit values, and means including stationary electrical contacts controlled by said actuating means and responsive to the prevailing count of said counting means for providing an indication of the zone within which each said line length is justifiable.

2. A justification-zone indicating counter comprising first word-space-selection means for preselecting an individual one of any of plural available minimum-word-space unit valves, accumulator means moveable in discrete unit-valued steps to accumulate the total length of a line of alpha-numeric characters and symbols each having an individual preselected unit-value width and including word spaces having said preselected individual word-space unit value, means for counting the number of word spaces in each said line, a multi-stepped cam means movable with said accumulator means for preselecting by depth of cam step any of plural maximum-justification-expansion word-space unit values, and means including stationary electrical contacts controlled by said cam member and responsive to the prevailing count of said counting means for providing an indication of the zone within which each said line length is justifiable.

3. A justification-zone indicating counter comprising first word-space-selection means for preselecting an individual one of any of plural available minimum-word-space unit values, accumulator means movble in discrete unit-valued steps to accumulate the total length of a line of alpha-numeric characters and symbols each having an individual preselected unit-value width and including word spaces having said preselected individual word-space unit value, means for counting the number of word spaces in each said line, a replaceable stepped cam member movable with said accumulator means for preselecting any of plural maximum-justification-expansion word-space unit values, and means including stationary electrical contacts controlled by said cam member and responsive to the prevailing count of said counting means for providing an indication of the zone within which each said line length is justifiable.

4. A justification-zone indicating counter comprising first word-space selection means for preselecting an individual one of any of plural available minimum-word-space unit values corresponding to the minimum unit-value thickness of a preselected space band, accumulator means movable in discrete unit-valued steps to accumulate the total length of a line of alpha-numeric characters and symbols each having an individual preselected unit-value width and including word spaces having said preselected individual word-space unit value, means for counting the number of word spaces in each said line, second word-space-selection means including a cam member having plural cam steps spaced transversely of the direction of movement of said accumulator means and of preselected step heights in said direction of movement for preselecting maximum-justification-expansion word-space unit values corresponding to the maximum unit-value usable expansion of said preselected space band, and means jointly controlled by said accumulator means and said second word-space-selection means and responsive to the prevailing count of said counting means for providing an indication of the zone within which each said line length is justifiable.

5. A justification-zone indicating counter comprising first word-space selection means for preselecting an individual one of any of plural available minimum-word-space unit values corresponding to the minimum unit-value thickness of a preselected space band, accumulator means movable in discrete unit-valued steps to accumulate the total length of a line of alpha-numeric characters and symbols each having an individual preselected unit-value width and including word spaces having said preselected individual word-space unit value, means for counting the number of word spaces in each said line, second word-space-selection means including a cam member having plural cam steps spaced transversely of the direction of movement of said accumulator means and of preselected uniform step height in said direction of movement for preselecting maximum-justification-expansion word-space unit values corresponding to the maximum unit-value usable expansion of said preselected space band, and means jointly controlled by said accumulator means and said second word-space-selection means and responsive to the prevailing count of said counting means for providing an indication of the zone within which each said line length is justifiable.

6. A justification-zone indicating counter comprising first word-space selection means for preselecting an individual one of any of plural available minimum-word-space unit values corresponding to the minimum unit-value thickness of a preselected space band, accumulator means movable in discrete unit-valued steps to accumulate the total length of a line of alpha-numeric characters and symbols each having an individual preselected unit-value width and including word spaces having said preselected individual word-space unit value, means for counting the number of word spaces in each said line, second word-space-selection means including a cam member having plural cam steps spaced transversely of the direction of movement of said accumulator means and of preselected by varying value of step height in said direction of movement for preselecting maximum-justification-expansion word-space unit values corresponding to the maximum unit-value usable expansion of said preselected space band, and means jointly controlled by said accumulator means and said second word-space-selection means and responsive to the prevailing count of said counting means for providing an indicaiton of the zone within which each said line length is justifiable.

7. A justification-zone indicating counter comprising first word-space-selection means for preselecting an individual one of any of plural available minimum-word-space unit values, accumulator means movable in discrete unit-valued steps to accumulate the total length of a line of alpha-numeric characters and symbols each having an individual preselected unit-value width and including word spaces having said preselected individual word-space unit value, means for counting the number of word spaces in each said line, a replaceable cam member movable with said accumulator means and having plural cam steps spaced transverse to the direction of cam-member movement and of preselected step heights in said direction of movement to provide preselection of plural maximum-justification-expansion word-space unit values, a plurality of pairs of stationary electrical contacts positioned transverse to said direction of cam-member movement for actuation by an individual one of the cam steps of said member, and means jointly controlled by said pairs of electrical contacts and the prevailing count of said counting means for providing an indication of the zone within which each said line length is justifiable.

8. A justification-zone indicating counter for a typewriter comprising a typewriter having a platen and manual key-lever operable type to reproduce on paper carried by said platen typed alpha-numeric characters and symbols and having a space bar manually operable to effect word space operations and a carriage return key manually operable to line space said platen and relatively position said platen and type to initiate the typing of a new line of copy, escapement means in said typewriter to effect discrete unit-valued relative step movement between said platen and type according to a preselected unit-value width individual to each said character and symbol, first word-space-selection means for controlling said escapement means to preselect an individual one of any of plural available minimum-word-space unit values of said relative movement upon operation of said space bar, indicating means movable to indicate the cumulative amount of said relative movement and thereby indicate the total unit-valued length of a line of alpha-numeric characters and symbols including word spaces of said preselected individual value, means for counting the number of word spaces in each said line, recording means responsive to each key lever and space bar operation for recording in a record medium coded information items representative of each typed alpha-numeric character and symbol and each word space, means controlled by said counting means and responsive to each carriage return key operation for controlling said recording means to record successive carriage-return and line-space information items in the absence of a word-space count by said counting means but to record successive carriage-return and elevate informaotion items upon the occurrence of at least one word space count by said counting means, second word-space-selection means movable with said indicating means and effective to preselect any of plural maximum-justification-expansion word-space unit values, and means controlled by said second word-space-selection means and responsive to the prevailing count of said counting means for providing in relation to said indicating means an indication of the zone within which each said line length is justifiable.

9. A justification-zone indicating counter for a typewriter comprising a typewriter having a platen, type, type-operating key levers manually and automatically operable to reproduce on paper carried by said platen typed alpha-numeric characters and symbols, a space bar manually and automatically operable to effect word space operations, at least one manually operable quad switch, and a carriage return key lever manually and automatically operable to line-space said platen and relatively position said platen and type to initiate the typing of a new line of copy; a typewriter escapement structure and plural escapement magnets electrically energizable individually and in combination to effect by control of said escapement structure discrete unit-valued relative step movement between said platen and type according to a preselected unit-value width individual to each said character and symbol; a plurality of diode rectifiers, electrical contacts individual to said key levers and controlled thereby for supplying through said diode rectifiers energization to said escapement magnets individually and in preselected combinations to effect said preselected unit-value width escapement movement between said platen and type; a multi-position manually adjustable switch and electrical contacts controlled by said space bar for controlling the individual and combinational energization of said escapement magnets to preselect any of plural minimum-word-space unit values of said relative movement upon operation of said space bar; an indicating scale associated with said platen to indicate the cumulative amount of said relative movement between said platen and type and thereby indicate the total unit-valued length of a line of alpha-numeric characters and symbols including word spaces of said preselected values; a stepping relay-switch having a magnet energized through electrical contacts controlled by actuation of said quad switch and each word-space escapement relative movement of said platen and type to indicate actuation of said quad switch and count the number of word spaces in each said line; recording means responsive to each key lever, quad switch, and space bar operation for recording in a record medium coded information items representative of quad selection and each typed alpha-numeric character and symbol and each word-space; electrical relays controlled by said stepping relay-switch and responsive to each carriage return key lever operation for controlling said recording means to record successive carriage-return and line-space information items in the absence of a space count by said stepping relay-switch but to record successive return and elevate information items upon the occurrence of at least one quad or word-space count by said stepping relay-switch; a stepped cam plate and a bank of electrical contacts having relative movement corresponding to said relative movement between said platen and type, the contacts of said bank being individual to and operable by the individual steps of said cam plate to preselect any of plural maximum-justification-expansion word-space unit values, and an indicator light energized under mutual control of said last mentioned electrical contacts and the switches of said stepping relay-switch for providing in relation to said indicating scale an indication of the zone within which each said line length is justifiable.

References Cited by the Examiner

UNITED STATES PATENTS

| | | | |
|---|---|---|---|
| 2,095,006 | 10/1937 | Paine | 199—51 X |
| 2,117,474 | 5/1938 | Goetz et al. | 199—51 |
| 2,287,793 | 6/1942 | Goetz | 199—51 |
| 2,379,862 | 7/1945 | Bush | 197—84.1 |
| 2,465,657 | 3/1949 | Norton | 197—84.1 |
| 2,487,890 | 11/1949 | Norton | 197—84.1 |
| 2,696,286 | 12/1954 | Leglise | 197—84.1 |
| 2,700,447 | 1/1955 | Blodgett | 197—20 |
| 2,705,554 | 4/1955 | Leglise | 197—84.1 |
| 2,788,881 | 4/1957 | Palmer | 197—187 |

FOREIGN PATENTS

| | | |
|---|---|---|
| 771,551 | 4/1957 | Great Britain. |
| 905,458 | 9/1962 | Great Britain. |

ROBERT E. PULFREY, *Primary Examiner.*

DAVID KLEIN, *Examiner.*

ERNEST T. WRIGHT, *Assistant Examiner.*

UNITED STATES PATENT OFFICE
CERTIFICATE OF CORRECTION

Patent No. 3,272,306 September 13, 1966

Frank A. DeWitt et al.

It is hereby certified that error appears in the above numbered patent requiring correction and that the said Letters Patent should read as corrected below.

Column 4, line 33, for "alpha-nmeric" read -- alpha-numeric --; lines 45 and 46, for "carcaige" read -- carriage --; column 7, line 54, before "length" insert -- line --; line 60, for "lne" read -- line --; column 8, lines 18 and 19, for "typican" read -- typical --; column 9, line 2, for "matrice" read -- matrices -- line 14, for "type" read -- typed --; column 15, line 36, for "SSN-43" read -- SSB-43 --; line 38, for "saymbol" read -- symbol --; column 16, line 28, for "to" read -- of --; column 21, line 24, for "delet-quad" read -- delete-quad --; column 22, line 26, for "energizing" read -- energized --; column 25, line 75, for "moveable" read -- movable --; column 26, line 17, for "movble" read -- movable --; column 27, line 17, for "by" read -- but --; line 51, for "reproduct" read -- reproduce --; column 28, lines 5 and 6, for "informaotion" read -- information --.

Signed and sealed this 26th day of September 1967.

(SEAL)
Attest:

ERNEST W. SWIDER
Attesting Officer

EDWARD J. BRENNER
Commissioner of Patents